United States Patent
Gotoh

(10) Patent No.: US 12,315,055 B2
(45) Date of Patent: May 27, 2025

(54) INFORMATION PROCESSING APPARATUS AND INFORMATION PROCESSING METHOD FOR PROCESSING SOUND OF REAL ENVIRONMENT FOR DISPLAYING VIRTUAL EXPERIENCE

(71) Applicant: SONY GROUP CORPORATION, Tokyo (JP)

(72) Inventor: Tomohiko Gotoh, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 132 days.

(21) Appl. No.: 17/925,899

(22) PCT Filed: May 21, 2021

(86) PCT No.: PCT/JP2021/019329
§ 371 (c)(1),
(2) Date: Nov. 17, 2022

(87) PCT Pub. No.: WO2021/241431
PCT Pub. Date: Dec. 2, 2021

(65) Prior Publication Data
US 2023/0186542 A1    Jun. 15, 2023

(30) Foreign Application Priority Data
May 29, 2020 (JP) ................................ 2020-093841

(51) Int. Cl.
*G06T 13/20* (2011.01)
*G06F 3/16* (2006.01)
(Continued)

(52) U.S. Cl.
CPC ............. *G06T 13/205* (2013.01); *G06F 3/165* (2013.01); *A63F 13/215* (2014.09); *A63F 13/52* (2014.09)

(58) Field of Classification Search
CPC ....... G06T 13/205; G06F 3/165; G06F 3/167; G06F 3/01; G06F 3/0481; A63F 13/215; A63F 13/52; A63F 13/217
See application file for complete search history.

(56) References Cited

U.S. PATENT DOCUMENTS 10,873,800 B1 *  12/2020  Khaleghimeybodi .. H04S 7/304
2018/0124466 A1 *   5/2018  Park ..................... H04N 23/631
(Continued)

FOREIGN PATENT DOCUMENTS

JP    2017-152010 A    8/2017
JP    2018-508849 A    3/2018
(Continued)

OTHER PUBLICATIONS

Inside (Jason's Video Games Source, "Inside—The Bridge: Avoid Air Force Blast, Rotating Arm Machine (Stops with Level) Timing Puzzle", published at YouTube Jun. 30, 2016, at https://www.youtube.com/watch?v=BkTRSIV07-c) (Year: 2016).*
(Continued)

*Primary Examiner* — William A Beutel
(74) *Attorney, Agent, or Firm* — CHIP LAW GROUP

(57) ABSTRACT

An information processing apparatus according to an embodiment of the present technology includes a generation unit and an operation control unit. The generation unit generates environmental information of a real space around a user on the basis of a detection result of a microphone unit that detects a sound in the real space. The operation control unit controls an operation of a virtual object presented in a virtual space constructed in accordance with the real space on the basis of the environmental information.

17 Claims, 9 Drawing Sheets

(51) Int. Cl.
 *A63F 13/215* (2014.01)
 *A63F 13/52* (2014.01)

(56) References Cited

U.S. PATENT DOCUMENTS

| 2019/0217198 A1* | 7/2019 | Clark | H04S 7/303 |
| 2023/0145966 A1* | 5/2023 | Jeong | G10L 25/48 |
| | | | 704/270 |

FOREIGN PATENT DOCUMENTS

| JP | 2019-087276 A | 6/2019 |
| JP | 2019-139793 A | 8/2019 |
| JP | 2020-507797 A | 3/2020 |

OTHER PUBLICATIONS

International Search Report and Written Opinion of PCT Application No. PCT/JP2021/019329, issued on Aug. 3, 2021, 10 pages of ISRWO.

\* cited by examiner

INFORMATION PROCESSING APPARATUS AND INFORMATION PROCESSING METHOD FOR PROCESSING SOUND OF REAL ENVIRONMENT FOR DISPLAYING VIRTUAL EXPERIENCE

CROSS REFERENCE TO RELATED APPLICATIONS

This application is a U.S. National Phase of International Patent Application No. PCT/JP2021/019329 filed on May 21, 2021, which claims priority benefit of Japanese Patent Application No. JP 2020-093841 filed in the Japan Patent Office on May 29, 2020. Each of the above-referenced applications is hereby incorporated herein by reference in its entirety.

TECHNICAL FIELD

The present technology relates to an information processing apparatus, an information processing method, and a computer-readable recording medium that provide a virtual experience to a user.

BACKGROUND ART

Patent Literature 1 describes a character image generation system in which a character image is synthesized with an image of a real space to present a virtual character. In this system, the image of the real space is used to identify a real object existing in the imaging range, and characteristic information indicating the characteristics of the real object is read. In accordance with the characteristic information, the operation of the virtual character synthesized with the image of the real space is controlled. This makes it possible, for example, to operate the virtual character so as to sit on a chair in the real space (paragraphs [0015], [0023], and [0025], FIGS. 6 and 7, etc. of the specification of Patent Literature 1).

CITATION LIST

Patent Literature

Patent Literature 1: Japanese Patent Application Laid-open No. 2019-139793

DISCLOSURE OF INVENTION

Technical Problem

The technologies of presenting virtual objects in accordance with a real space are expected to be applied to various fields such as entertainment, education, and user support, and there is a need for technologies of easily providing a realistic virtual experience.

In view of the above circumstances, it is an object of the present technology to provide an information processing apparatus, an information processing method, and a computer-readable recording medium that are capable of easily providing a realistic virtual experience.

Solution to Problem

In order to achieve the above object, an information processing apparatus according to an embodiment of the present technology includes a generation unit and an operation control unit.

The generation unit generates environmental information of a real space around a user on the basis of a detection result of a microphone unit that detects a sound in the real space.

The operation control unit controls an operation of a virtual object presented in a virtual space constructed in accordance with the real space on the basis of the environmental information.

In this information processing apparatus, the environmental information of the real space is generated using the sound of the real space around the user detected by the microphone unit. This makes it possible to easily grasp a real environment. On the basis of this environmental information, the operation of a virtual object on the virtual space constructed in accordance with the real space is controlled. This makes it possible to present the virtual object in accordance with the real environment, for example. As a result, it is possible to easily provide a realistic virtual experience.

The microphone unit may be a microphone array including at least three microphones having relative positions fixed to each other.

The generation unit may generate, as the environmental information, wind information indicating at least one of a direction or intensity of wind in the real space on the basis of wind noise detected by the microphone array.

The operation control unit may control an operation expressing a reaction of the virtual object to the wind in the real space on the basis of the wind information.

The operation control unit may detect a shielding structure that blocks the wind in the real space or the virtual space, and adjust the reaction of the virtual object to the wind in the real space in accordance with the shielding structure.

The generation unit may generate, as the environmental information, ground surface information indicating a material of a ground surface in the real space on the basis of a footstep of the user, the footstep being detected by the microphone array.

The virtual object may be a virtual character. In this case, the operation control unit may control a footstep of the virtual character on the basis of the ground surface information.

The generation unit may generate a first map to which the ground surface information is mapped.

The virtual object may be a virtual character. In this case, the operation control unit may change a footstep of the virtual character on the basis of the first map.

The information processing apparatus may further include an acquisition unit that acquires a second map, the second map being a segmentation map of the real space, the segmentation map being generated on the basis of an image of the real space. In this case, the generation unit may generate an integrated map in which the first map and the second map are integrated.

The virtual object may be a virtual character. In this case, the operation control unit may control a footstep of the virtual character on the basis of the integrated map.

The generation unit may generate, as the environmental information, noise information indicating a noise level in the real space on the basis of a detection result of the microphone unit.

The virtual object may be a virtual character. In this case, the operation control unit may control at least one of a volume of utterance, a content of the utterance, or a way of the utterance by the virtual character on the basis of the noise information.

The noise information may be information indicating a first noise level, the first noise level being a noise level at a position of the user. In this case, the operation control unit may estimate a second noise level on the basis of the first noise level, the second noise level being a noise level at a position of the virtual character, and may control an operation of the virtual character in accordance with the second noise level.

The operation control unit may control the operation of the virtual character in a plurality of stages divided corresponding to the second noise level.

The virtual space may be an extended real space constituted by superimposing the virtual object on the real space.

The microphone unit may be provided to at least one of a device to be worn by the user or a device to be carried by the user.

An information processing method according to an embodiment of the present technology is an information processing method to be executed by a computer system, the method including: generating environmental information of a real space around a user on the basis of a detection result of a microphone unit that detects a sound in the real space; and controlling an operation of a virtual object presented in a virtual space constructed in accordance with the real space on the basis of the environmental information.

A computer-readable recording medium according to an embodiment of the present technology stores a program that causes a computer to execute the steps of: generating environmental information of a real space around a user on the basis of a detection result of a microphone unit that detects a sound in the real space; and controlling an operation of a virtual object presented in a virtual space constructed in accordance with the real space on the basis of the environmental information.

MODE(S) FOR CARRYING OUT THE INVENTION

Embodiments according to the present technology will now be described below with reference to the drawings.

First Embodiment

[Outline of Mobile System]

Figure 1:
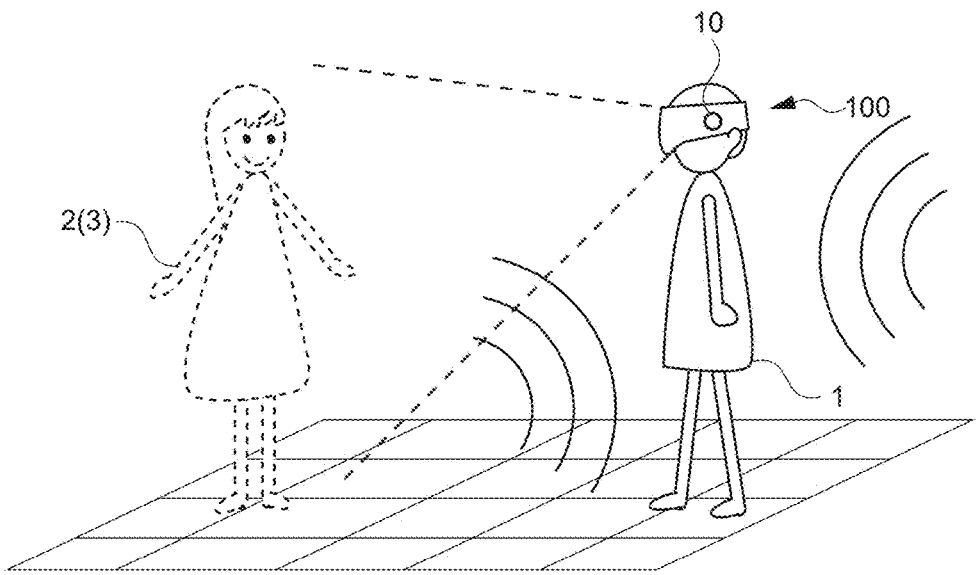
FIG. 1 is a schematic diagram showing the outline of an operation of an HMD according to a first embodiment of the present technology.

FIG. 1 is a schematic diagram showing the outline of the operation of an HMD according to a first embodiment of the present technology.

A head mounted display 100 (HMD) is an apparatus that presents an image or sound of a virtual object 2 to a user 1, and is an example of a mobile system that provides a virtual experience to the user 1 at various locations. Hereinafter, the real space in which the user 1 is present will be described as a real space. Further, the space in which the virtual object 2 is presented will be referred to as a virtual space.

In this embodiment, the HMD 100 is configured to present an image of the virtual object 2 to be superimposed on the scene of the real space. Therefore, the user 1 wearing the HMD 100 can visually recognize the scene of the real space and at the same time visually recognize the virtual object 2 (virtual space). This makes it possible for the user 1 to experience augmented reality (AR), mixed reality (MR), and the like.

In the HMD 100, a virtual space corresponding to the real space around the user 1 is constructed, and the virtual object 2 is presented in the virtual space. For example, on the basis of the result of sensing the shape of the real space, a virtual space having a spatial shape similar to that of the real space is constructed, and the virtual object 2 is arranged on the virtual space.

In the example shown in FIG. 1, a virtual ground surface is set so as to coincide with the ground surface of the real space in which the user 1 stands, and a virtual character 3 that is the virtual object 2 is disposed on the virtual ground surface. This makes it possible to present a virtual character 3 or the like that moves on the actual floor to the user 1.

In the following, a case where the virtual character 3 is mainly presented as an example of the virtual object 2 will be described. Note that the present technology is applicable to any virtual object 2 other than the virtual character 3.

As shown in FIG. 1, the HMD 100 worn by the user 1 includes a microphone unit 10 that detects sounds in the real space. FIG. 1 schematically shows the microphone unit 10 provided to the HMD 100, and the sound generated in the real space.

In this embodiment, environmental information of the real space is generated on the basis of the detection result of the microphone unit 10. Here, the environmental information is information representing the environment of the real space, which is estimated on the basis of environmental sounds of the real space. For example, the detection result of the microphone unit 10 is analyzed, and thus information indicating a noise level in the real space, wind direction and wind speed, the material of the ground surface, and the like is generated as environmental information.

Further, the position of the microphone unit 10 changes in accordance with the movement of the user 1. Therefore, use of the microphone unit 10 makes it possible to efficiently sense the surrounding environment of the user 1. The method of generating the environmental information will be described in detail later.

In the HMD 100, the operation of the virtual object 2 (virtual character 3) is controlled on the basis of the environmental information generated on the basis of the sound of the real space. For example, control for changing the words and actions of the virtual character 3 in accordance with the noise and the wind direction, and control for changing the foot sound (moving sound) of the virtual character 3 in accordance with the material of the ground surface are executed. In addition, any control according to the contents of the environmental information may be executed.

As described above, the microphone unit 10 is provided to the HMD 100 to be worn by the user 1, and ambient environmental sounds are picked up and analyzed using the microphone unit 10, so that it is possible to efficiently acquire ambient environmental information. This makes it possible to easily provide natural, realistic behaviors and image representation of the virtual character 3 in a wide range of the real space.

[Configuration of HMD 100]

Figure 2A:
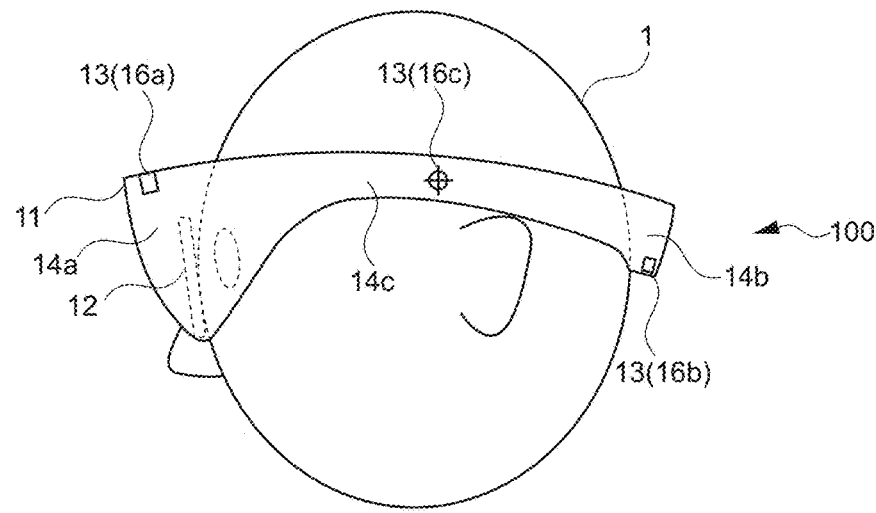
FIGS. 2A and 2B are schematic diagrams showing an appearance of the HMD.
Figure 2B:
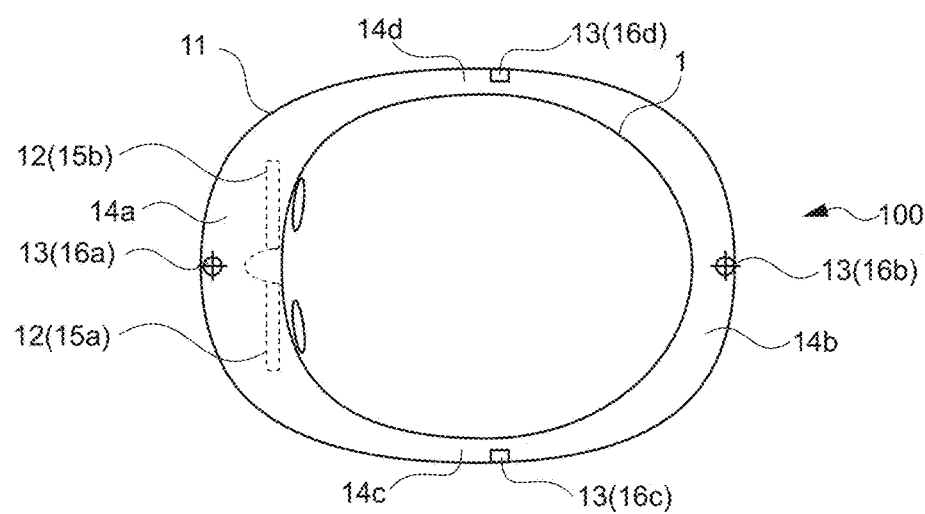
Figure 3:
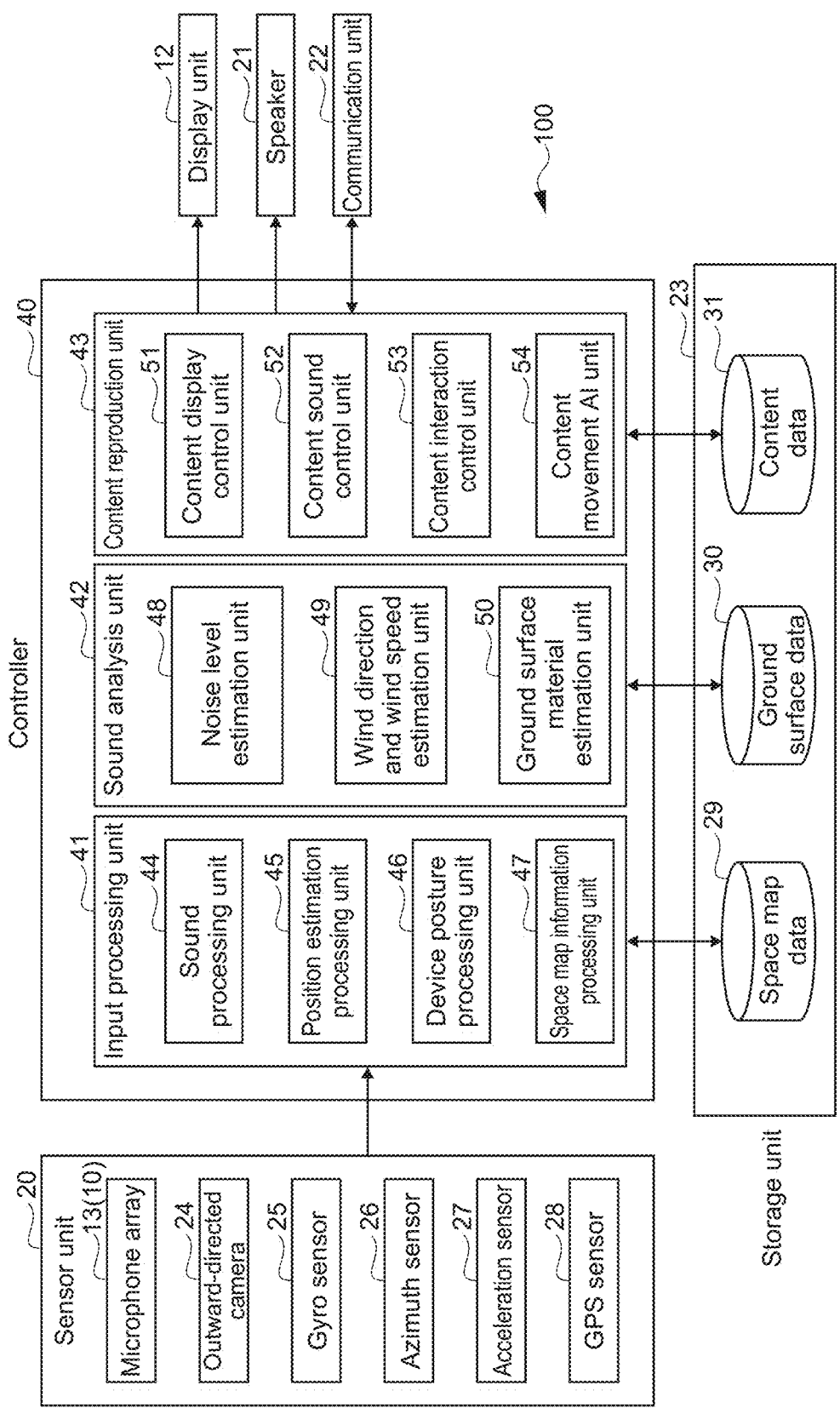
FIG. 3 is a block diagram showing a configuration example of the HMD.

FIGS. 2A and 2B are schematic diagrams showing the appearance of the HMD 100. FIG. 3 is a block diagram showing a configuration example of the HMD 100. Hereinafter, the configuration of the HMD 100 will be described in detail with reference to FIGS. 2A, 2B, and 3.

FIGS. 2A and 2B schematically show the appearance of the HMD 100 as viewed from the left side and the upper side of the HMD 100. The HMD 100 includes a housing unit 11, a display unit 12, and a microphone array 13. The microphone array 13 corresponds to the microphone unit 10 described above.

The housing unit 11 is a housing constituting the main body of the HMD 100. The housing unit 11 has an annular shape as a whole, and is mounted so as to surround the head portion of the user 1. The housing unit 11 includes a front surface portion 14a, a rear surface portion 14b, a left side surface portion 14c, and a right side surface portion 14d.

The front surface portion 14a is a portion disposed in front of the eyes of the user 1, and is configured to cover the range from the nose to the eyes. The rear surface portion 14b is a portion disposed on the opposite side of the front surface portion 14a, and is configured to cover the back of the head of the user 1. The front surface portion 14a and the rear surface portion 14b are connected to each other via the left side surface portion 14c and the right side surface portion 14d that hang on the left ear and the right ear of the user 1, respectively.

Note that the present technology is not limited to the structure shown in FIGS. 2A and 2B and can also be applied to, for example, a case where an eyeglass-type HMD (smart glass or the like) is used.

The display unit 12 is a display for displaying the virtual object 2. The display unit 12 includes a left-eye display 15a and a right-eye display 15b. The left-eye display 15a and the right-eye display 15b are disposed on the front surface portion 14a so as to cover the left and right eyes (fields of view) of the user 1, respectively. Images for the left eye and the right eye or the like are displayed on the left-eye and right-eye displays 15a and 15b, respectively.

As the left-eye and right-eye displays 15a and 15b, for example, a transmissive display is used. In this case, for example, the front surface portion 14a is formed using a transparent member. Accordingly, the user 1 can visually recognize a front view through the displays 15a and 15b. As the transmissive display, a transmissive organic EL display, a liquid crystal display (LCD) display, or the like is used.

In addition to the above, a specific configuration of the display unit 12 is not limited. For example, a transmissive display of any method such as a method of projecting and displaying an image on a transparent screen or a method of displaying an image using a prism or the like may be used as appropriate. Further, a non-transmissive display may also be used. In other words, the HMD 100 may be configured as an immersive display device. In this case, for example, the virtual object 2 is superimposed and displayed on an image of a camera (outward-directed camera 24 to be described later or the like) that images the front of the HMD 100. Further, the display may be separated into a display for the right eye and a display for the left eye, or a single display may be used to display an image. Further, a lens for correcting visual acuity, a light shielding filter for controlling the amount of transmitted light, and the like may be provided in accordance with the display.

The microphone array 13 includes a plurality of microphones 16, and detects sounds in the real space around the user 1. In this embodiment, a microphone array 13 including at least three microphones 16 having relative positions fixed to each other is used. For example, use of three or more microphones 16 at fixed positions makes it possible to estimate the three-dimensional direction and spatial position of a sound source. This makes it possible to achieve the estimation of a sound source present in the real space, classification of sounds, and the like with high accuracy.

The microphone array 13 shown in FIGS. 2A and 2B include four microphones 16a to 16d. The microphone 16a is disposed at the center of the front surface portion 14a toward the upper side of the HMD 100, and the microphone 16b is disposed at the center of the rear surface portion 14b toward the lower side of the HMD 100. Further, the microphones 16c and 16d are respectively disposed on the left side surface portion 14c and the right side surface portion 14d so as to be located at the left and right positions opposite to each other. The microphones 16c and 16d are directed to the left and right of the HMD 100, respectively. The arrangement of those microphones 16a to 16d (microphone array 13) is fixed on the housing unit 11.

As described above, in the microphone array 13, the microphones 16 are disposed on the upper and lower surfaces and the left and right surfaces of the HMD 100. This makes it possible to detect a correlation or time difference not only with respect to sounds from the front and the right and left directions, but also with respect to sounds from the lower direction. As a result, for example, it is possible to estimate the wind direction not only in the horizontal direction but also in a wide range including the lower direction, and to detect footsteps with high accuracy.

Note that the configuration of the microphone array 13 is not limited to the example shown in FIGS. 2A and 2B.

As shown in FIG. 3, the HMD 100 further includes a sensor unit 20, a speaker 21, a communication unit 22, a storage unit 23, and a controller 40. Of those, the communication unit 22, the storage unit 23, and the controller 40 may be provided in the main body (housing unit 11) of the HMD 100, or may be provided in a control apparatus (e.g., personal computer or the like) configured separately from the main body of the HMD 100.

The sensor unit 20 includes a plurality of sensors mounted on the housing unit 11. The microphone array 13 described above is included in the sensor unit 20. The sensor unit 20 further includes an outward-directed camera 24, a gyro sensor 25, an azimuth sensor 26, an acceleration sensor 27, and a GPS sensor 28.

The outward-directed camera 24 is a camera that images an environment (such as the field of view of the user 1) around the HMD 100. The outward-directed camera 24 functions as, for example, a recognition camera device for recognizing the shape of a real object or a real space.

The gyro sensor 25 is a sensor that detects an angular velocity of the HMD 100. The azimuth sensor 26 is a sensor that detects the terrestrial magnetism to detect the direction of the HMD 100. The acceleration sensor 27 is a sensor that detects an acceleration applied to the HMD 100. The gyro sensor 25, the azimuth sensor 26, and the acceleration sensor 27 detect a change in posture of the HMD 100 as motion sensors.

The GPS sensor 28 receives the signals of a global positioning system (GPS) transmitted from satellites to estimate an approximate position of the HMD 100 in the real space.

In addition, any sensor such as a distance sensor or a line-of-sight detection sensor may be mounted.

The speaker 21 is disposed in the housing unit 11 of the HMD 100 and reproduces sounds on the basis of sound signals generated by the controller 40 or the like to be described later. Alternatively, a reproduction apparatus (earphone, headphone, or the like) that can be connected to the HMD 100 by a radio connection or a wired connection may be used as the speaker 21.

The communication unit 22 is a module for executing network communication, short-range wireless communication, and the like with other devices. For example, a wireless LAN module such as Wi-Fi or a communication module such as Bluetooth (registered trademark) is provided. For example, the communication unit 22 receives necessary data from a server or the like or transmits a recognition result about the real space to another user.

The storage unit 23 is a nonvolatile storage device. As the storage unit 23, for example, a recording medium using a solid-state device such as a solid state drive (SSD) or a magnetic recording medium such as a hard disk drive (HDD) is used. In addition to the above, the type or the like of the recording medium used as the storage unit 23 is not limited. For example, any recording medium that records data in a non-transitory manner may be used.

The storage unit 23 stores a control program (not shown) for controlling the entire operation of the HMD 100. The control program is a program according to this embodiment, and the storage unit 23 corresponds to a computer-readable recording medium on which the program is recorded.

Further, as shown in FIG. 3, space map data 29, ground surface data 30, and content data 31 are stored in the storage unit 23.

The space map data 29 is, for example, data of a space map in which a three-dimensional shape of a real space is represented by a predetermined coordinate system (e.g., global coordinate system). Here, a segmentation map of the real space generated on the basis of the image of the real space is used as the space map.

In the HMD 100, for example, segmentation processing for classifying real objects (buildings, furniture, people, ground, etc.) included in real-space images captured by the outward-directed camera 24 is executed. A map in which this segmentation result is associated with a three-dimensional shape of the real space becomes a segmentation map. In this embodiment, the space map corresponds to a second map.

The ground surface data 30 is data relating to the ground surface in the real space. The ground surface data 30 includes, for example, data (pattern data) obtained by combining a predefined footstep pattern and a ground surface material corresponding to that footstep.

Further, the ground surface data 30 includes data of a ground surface map to which ground surface information is mapped. The ground surface information is information indicating the material of the ground surface, and is an example of the above-mentioned environmental information. The ground surface information is generated by a ground surface material estimation unit 50 to be described later. For example, data obtained by combining the material of the ground surface estimated by the ground surface material estimation unit 50 and the position of the HMD 100 at the global coordinates when the material is estimated is stored as a ground surface map. In this embodiment, the ground surface map corresponds to a first map.

Note that the space map and the ground surface map are updated and integrated as appropriate in accordance with the operation of the HMD 100. This point will be described in detail below with reference to FIG. 13 and the like.

The content data 31 is data of common 3D game content. The content data 31 includes various types of data such as model data constituting a virtual object (3D model), sound data, parameter data defining the arrangement, direction, and size of the virtual object, sound data associated with the virtual object, animation data of the virtual object, and motion data defining the behavior of the virtual object.

The controller 40 controls the operations of the respective blocks of the HMD 100. The controller 40 has a hardware configuration necessary for a computer, such as a CPU or a memory (RAM, ROM). The CPU loads the control program stored in the storage unit 23 to the RAM and executes the control program, so that various types of processing are executed. In this embodiment, the controller 40 corresponds to an information processing apparatus.

For example, a programmable logic device (PLD) such as a field programmable gate array (FPGA) or another device such as an application specific integrated circuit (ASIC) may be used as the controller 40. Further, for example, a processor such as a graphics processing unit (GPU) may be used as the controller 40.

In this embodiment, the CPU of the controller 40 executes the program according to this embodiment, so that an input processing unit 41, a sound analysis unit 42, and a content reproduction unit 43 are implemented as functional blocks. Those functional blocks perform an information processing method according to this embodiment. Note that dedicated hardware such as an integrated circuit (IC) may be used as appropriate in order to implement the respective functional blocks.

The input processing unit 41 acquires the output of the sensor unit 20 and the data stored in the storage unit 23, and executes various types of data processing required for the basic operation of the HMD 100. The input processing unit 41 includes a sound processing unit 44, a position estimation processing unit 45, a device posture processing unit 46, and a space map information processing unit 47.

With the sound signals picked up by the respective microphones 16 constituting the microphone array 13 (microphone unit 10) as an input, the sound processing unit 44 separates a plurality of sound sources and estimates the position of each sound source.

The sound processing unit 44 detects, for example, the waveform, amplitude (volume), phase, or the like of the sound signal output from each microphone 16. On the basis of those detection results, the waveform of each sound source is separated, and the position of the sound source (or the direction of the sound source) is estimated.

A specific method of separating sound sources or estimating the position of a sound source is not limited, and for example, a technique of distinguishing a sound source by using machine learning or the like may be used.

Note that since the microphone array 13 is fixed to the HMD 100, the posture and position of the microphone array 13 also change in accordance with a change in the posture and position of the user 1. In other words, the position and posture of the microphone array 13 in the global coordinate system are not fixed. In the sound processing unit 44, such a change in the posture and position of the microphone array 13 is corrected, and the position and direction of the sound source in the global coordinate system are estimated.

Figure 4:
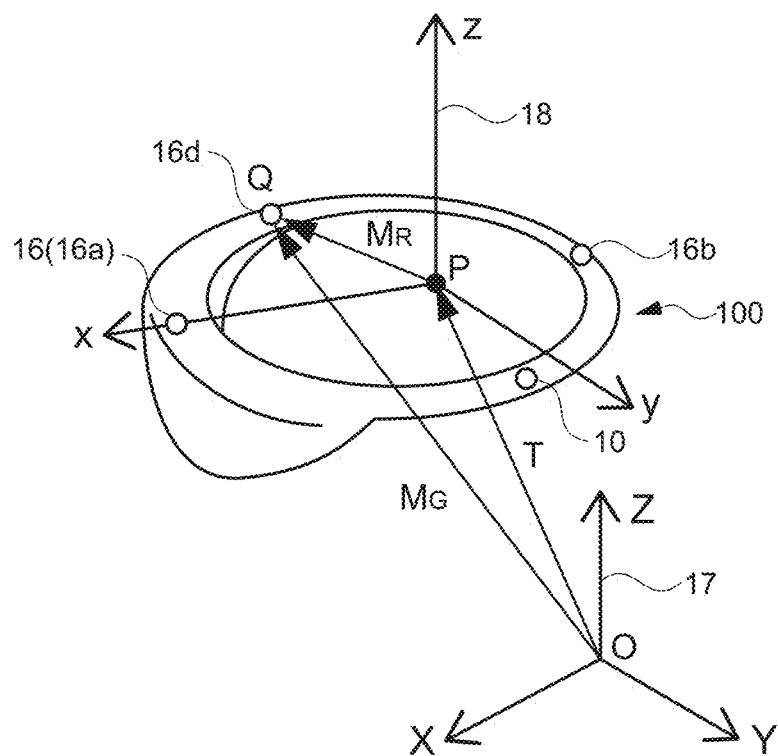
FIG. 4 is a schematic diagram showing a calculation example of a microphone position in a global coordinate system.

FIG. 4 is a schematic diagram showing a calculation example of the microphone position in the global coordinate system. FIG. 4 schematically shows a global coordinate system 17 representing a real spatial position (XYZ coordinates), and a local coordinate system 18 of the HMD 100 (xyz coordinates). Further, in FIG. 4, the microphones 16a to 16d provided to the HMD 100 are schematically shown using white circles.

Hereinafter, the origin of the global coordinate system 17 will be denoted by O, and the origin of the local coordinate system 18 of the HMD 100 (the position of the HMD 100) will be denoted by P. Further, the position of the microphone 16 in the local coordinate system 18 will be denoted by Q.

A vector $M_G$ representing the position of the microphone 16 in the global coordinate system 17 (vector from the point O toward the point Q) is represented by the following equation using a vector $M_R$ representing the position of the microphone 16 in the local coordinate system 18 (vector from the point P toward the point Q) and a transformation matrix T.

$$M_G = T \cdot M_R$$

Here, the transformation matrix T is a matrix for transforming a vector of the local coordinate system 18 into a vector of the global coordinate system 17. The transformation matrix T is calculated on the basis of the position of the HMD 100 in the global coordinate system 17 (point P) estimated by the position estimation processing unit 45 to be described later, and the posture of the HMD 100 estimated by the device posture processing unit 46. Further, since each microphone 16 is fixed to the HMD 100 (housing unit 11), $M_R$ is a fixed value.

The arrangement of the microphones 16 on the HMD 100 is fixed in such a manner, and thus the relative positional relationship between the microphones 16 is known. The sound processing unit 44 converts the positions of the microphones 16 into positions in the global coordinate system using a posture recognition result and a self-position estimation result of the main body of the HMD 100. This makes it possible to estimate the position and direction of the sound source in the global coordinate system.

Returning to FIG. 3, the position estimation processing unit 45 estimates the current position of the HMD 100. Specifically, the position estimation processing unit 45 executes processing of simultaneous localization and mapping (SLAM) in which the self-position estimation and the creation of a surrounding environmental map are performed at the same time on the basis of the output of the outward-directed camera 24 and the motion sensor (gyro sensor 25, azimuth sensor 26, and acceleration sensor 27). The surrounding environmental map is, for example, a map obtained by estimating the shape of the real space around the HMD 100, the arrangement of real objects, and the like. The current position of the HMD 100 in the surrounding environmental map is estimated as the self-position. The recognition result by SLAM is output to the space map information processing unit 47.

The device posture processing unit 46 detects a change in the posture of the HMD 100 on the basis of the output of the motion sensor. Further, the device posture processing unit 46 estimates the direction of gravity (vertical direction). On the basis of the estimated direction of gravity, the current posture of the HMD 100 (e.g., roll angle, pitch angle, or yaw angle) is estimated.

The space map information processing unit 47 manages the space map data 29.

The space map data 29 may be created in advance and stored in the storage unit 23. In this case, the space map data 29 is read as needed.

Further, for example, the space map data 29 may be dynamically generated during the operation of the HMD 100. For example, the space map information processing unit 47 newly generates a space map on the basis of the recognition result by SLAM. Specifically, connection processing for connecting the surrounding environmental maps created at different timings and matching processing for correcting deviations between the maps are executed. The combined surrounding environmental map is stored in the storage unit 23 as a new space map.

In such a manner, the space map information processing unit 47 acquires the space map. In this embodiment, the space map information processing unit 47 functions as an acquisition unit.

In addition, the space map information processing unit 47 associates the ground surface data 30 (ground surface map) output by the ground surface material estimation unit 50, which will be described later, with the space map data 29 (space map). As described above, a space map 61 is a segmentation map of the real space. The space map information processing unit 47 integrates the ground surface map included in the ground surface data 30, as a segmentation result in the space map 61.

Further, the space map information processing unit 47 estimates the position of the HMD 100 in the global coordinate system on the basis of the space map. For example, the keyframes on the space map are compared with the images captured by the outward-directed camera 24 to calculate the position of the HMD 100 in the global coordinate system. In searching for a keyframe, rough position information of the HMD 100 detected by using the GPS sensor 28 may be referred to.

The sound analysis unit 42 generates environmental information of the real space on the basis of the detection result of the microphone array 13 (microphone unit 10) that detects sounds around the user 1. For example, the environmental information is generated by analyzing sounds separated by the sound processing unit 44 (typically, environmental sounds). Alternatively, the environmental information may be generated by analyzing the sound signals output from the microphone array 13 as they are. In this embodiment, the sound processing unit 44, the space map information processing unit 47, and the sound analysis unit 42 cooperate with each other to implement a generation unit.

As shown in FIG. 3, the sound analysis unit 42 includes a noise level estimation unit 48, a wind direction and wind speed estimation unit 49, and a ground surface material estimation unit 50.

The noise level estimation unit 48 generates noise information indicating the noise level in the real space as environmental information on the basis of the detection result of the microphone array 13. Specifically, the overall volume level of the sounds picked up by the microphone array 13 is estimated as the noise level. Alternatively, among the sound sources separated by the sound analysis unit 42, the sound source to be noise may be identified, and the noise level may be estimated on the basis of the volume of that sound source.

The method of estimating the noise level is not limited.

The wind direction and wind speed estimation unit 49 generates wind information indicating at least one of the direction (wind direction) or intensity (wind speed) of wind in the real space, as environmental information, on the basis of the wind noise detected by the microphone array 13. For example, the wind direction and the wind speed are estimated from the difference in arrival time of the wind noise at each microphone 16. Note that only one of the wind direction and the wind speed may be estimated as wind information.

The method of estimating the wind direction and wind speed is not limited.

The ground surface material estimation unit 50 generates ground surface information indicating the material of the ground surface in the real space, as environmental information, on the basis of the footsteps of the user 1 detected by the microphone array 13. Specifically, a corresponding material of the ground surface (asphalt, grass, gravel road, pool of water, etc.) is estimated from the pattern of the footsteps of the user 1.

There is no limitation on how to estimate the material of the ground surface from footsteps.

Further, the ground surface material estimation unit 50 generates a ground surface map by mapping the ground surface information (material of the ground surface). The ground surface map is appropriately stored in the storage unit 23 as the ground surface data 30.

The content reproduction unit 43 reproduces content (virtual object 2 such as virtual character 3) to be presented in the virtual space. For example, in accordance with the progress of an application executed by the HMD 100, the content data 31 necessary for reproducing the content is read from the storage unit 23. Using the read data, image data of the virtual object 2 to be output to the display unit 12 and sound data to be output to the speaker 21 are generated.

Further, when the content is reproduced, the behavior of the virtual object 2, the method of expressing the virtual object 2, and the like are controlled in accordance with the environmental information such as the noise information, the wind information, the ground surface information, and the like described above. In such a manner, the content reproduction unit 43 controls the operation of the virtual object 2 that is presented in the virtual space configured in accordance with the real space on the basis of the environmental information. In this embodiment, the content reproduction unit 43 corresponds to an operation control unit.

As shown in FIG. 3, the content reproduction unit 43 includes a content display control unit 51, a content sound control unit 52, a content interaction control unit 53, and a content movement AI unit 54.

The content display control unit 51 controls the display of the virtual object 2. Specifically, image data for displaying the virtual object 2 is generated on the basis of the content data 31. The virtual object 2 is displayed, for example, with a preset behavior or appearance. Further, when there is a specific interaction with respect to the virtual object 2, the content interaction control unit 53 executes processing of changing the behavior or appearance of the virtual object 2 in response to the interaction.

The content sound control unit 52 controls sounds related to the virtual object 2. For example, on the basis of the content data 31, sound data such as a sound generated by the virtual character 3 or a moving sound (footsteps, etc.) of the virtual character 3 is generated. Those pieces of sound data are basically controlled in accordance with the progress of the application. Further, when there is a specific interaction with respect to the virtual object 2, the content interaction control unit 53 executes processing of changing each piece of the sound data in response to the interaction.

The content interaction control unit 53 controls the reaction or the like of the virtual object 2 when there is an interaction with respect to the virtual object 2. For example, processing of selecting data to be reproduced (e.g., animation data or sound data) or processing of changing the display itself of the virtual object 2 is executed according to the content of the interaction or the like.

The interaction with respect to the virtual object 2 includes an interaction caused by the action of the user 1. For example, an interaction accompanied by movement or change in the posture of the user 1 (such as an approach to the virtual object 2) or an interaction accompanied by specifying a position by an operation input of the user 1 (such as a selection operation for the virtual object 2) is detected, and the virtual object 2 is reproduced in accordance with each interaction.

Further, the interaction with respect to the virtual object 2 includes an interaction corresponding to the environmental information (noise information, wind information, ground surface information, and the like) generated by the sound analysis.

For example, processing of changing the hair, clothes, personal belongings, and the like of the virtual character 3 in accordance with the estimated wind direction and intensity (wind information) is performed. Further, for example, processing of changing the utterance of the virtual character 3 in accordance with the noise level and processing of changing the footsteps of the virtual character 3 in accordance with the material of the ground surface are executed.

It can be said that those types of processing are processing of causing the virtual object 2 to react in accordance with a real environment.

The content movement AI unit 54 controls the movement of the virtual object 2 in the virtual space. For example, processing of autonomously moving the virtual object 2 (virtual character 3) according to a predetermined movement rule is executed. As the moving rule, for example, a rule for approaching the user 1 when the noise is large, or a rule for walking side by side when the user 1 starts walking is set. In addition, any movement rule may be set.

Figure 5:
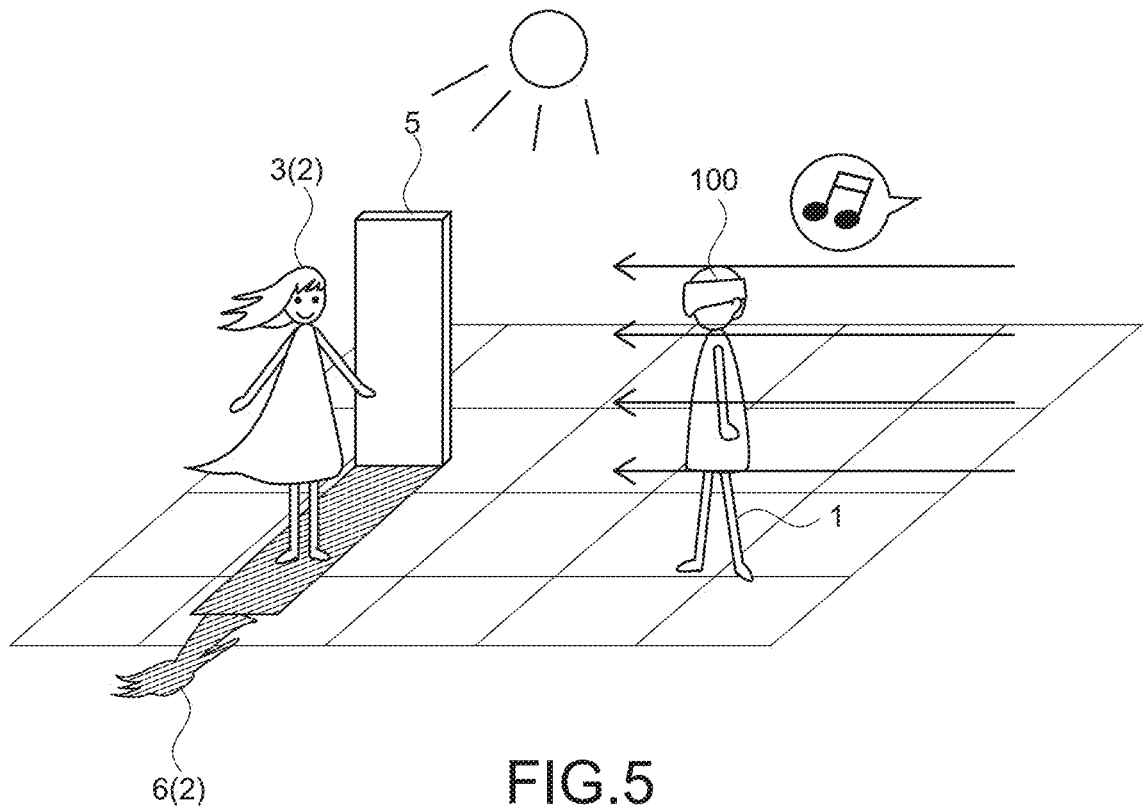
FIG. 5 is a schematic diagram showing an example of a scene in which a virtual character is presented.

FIG. 5 is a schematic diagram showing an example of a scene in which the virtual character 3 is presented. FIG. 5 schematically shows a virtual character 3 presented to the user 1 who uses the HMD 100 outdoors. Further, in FIG. 5, the wind flowing through the real space is schematically shown using the arrows, and the environmental sound generated in the real space is schematically shown with a balloon.

Hereinafter, a scene in which a virtual girl (virtual character 3) stands in front of the user 1 (e.g., a position about 2 m ahead of the user 1) is assumed.

Further, in FIG. 5, a pillar 5, which is a real object, blocks external light (sunlight, etc.) to make a shadow. The virtual character 3 is displayed at a position overlapping with the shadow of the pillar 5. At that time, a shadow object 6 representing the shadow of the virtual character 3 is displayed so as to extend the shadow of the pillar 5 in accordance with the direction of the external light. In such a manner, the virtual object 2 is displayed in accordance with the real object existing in the real space. Therefore, the virtual space perceived by the user 1 becomes an extended real space constituted by superimposing the virtual object 2 on the real space.

In the following, a method of controlling the virtual character 3 presented in the extended real space in accordance with the environment of the real space will be described in detail.

[Basic Operation of HMD]

Figure 6:
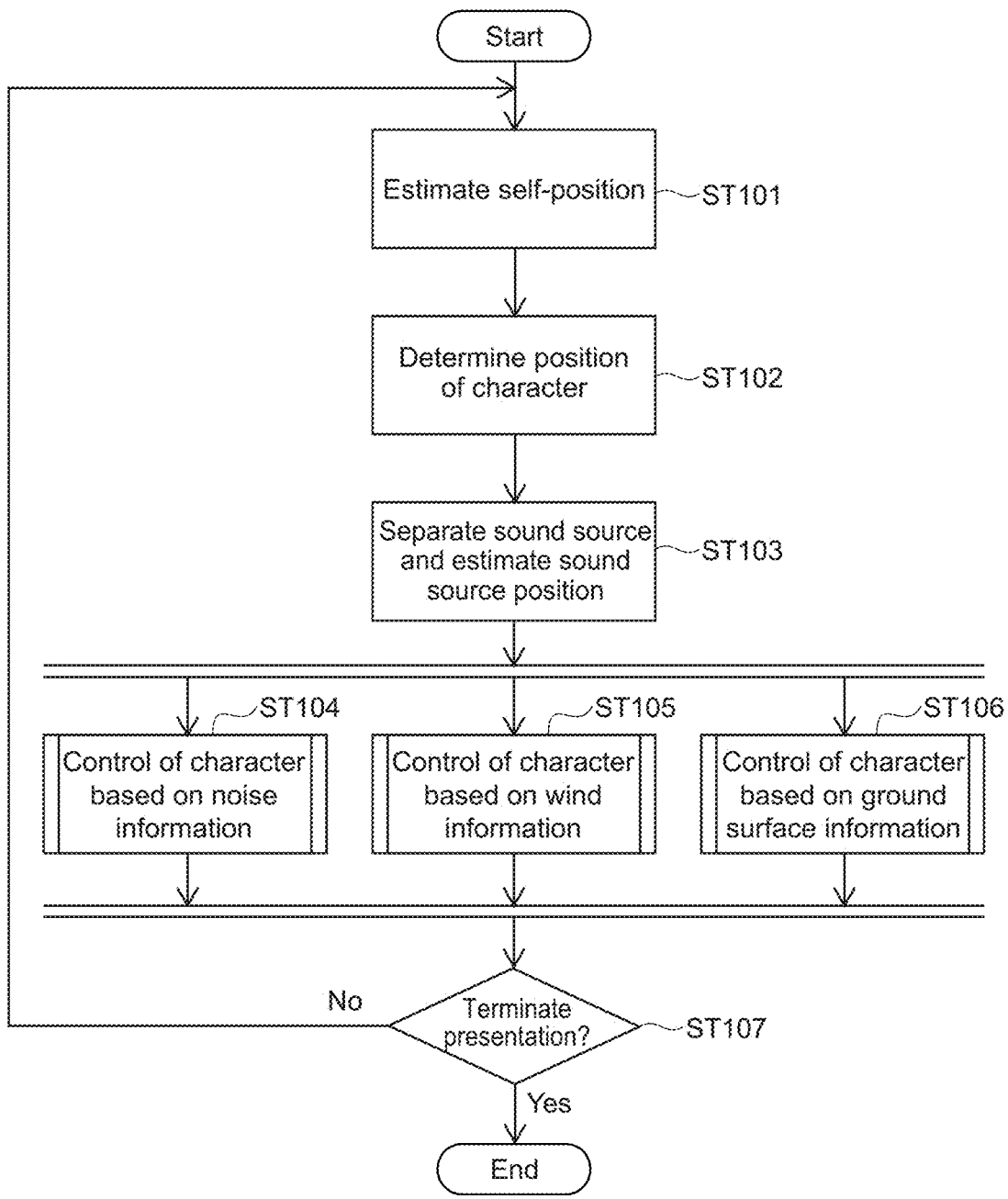
FIG. 6 is a flowchart showing an example of a basic operation of the HMD.

FIG. 6 is a flowchart showing an exemplary basic operation of the HMD 100. The processing shown in FIG. 6 is loop processing that is repeatedly executed during operation of an application for presenting a virtual object 2 (content), for example. Further, in the HMD 100, it is assumed that the data necessary for self-position estimation is acquired and the sound is picked up by the microphone array 13 in real time.

First, the self-position of the HMD 100 is estimated (Step 101). Here, the position estimation processing unit 45 and the space map information processing unit 47 estimate the position of the HMD 100 in the global coordinate system on the basis of the recognition result by SLAM and the space map. At that time, the space map is updated as necessary, for example. Further, the device posture processing unit 46 estimates the posture of the HMD 100 on the basis of the output of each motion sensor.

Next, the display position of the virtual character 3 is determined (Step 102). For example, the content display control unit 51 reads, from the content data 31, the model data of the virtual character 3 to be displayed, and an instruction of the display position of the virtual character 3 (e.g., 2 m ahead of the user 1). Subsequently, the display position of the virtual character 3 in the space map (virtual space) is determined in accordance with the self-position of the HMD 100 estimated in Step 101. This display position is the position of the virtual character 3 in the global coordinate system.

Next, sound source separation and sound source position estimation are performed on the basis of the detection result of the microphone array 13 (Step 103). Specifically, the sound signal of each channel (microphone 16) picked up by the microphone array 13 is output to the sound processing unit 44 and is separated into a waveform for each sound source. Here, for example, utterance of the user 1, utterance of another person, chimes of schools, buzzer sounds of signals, travel noise of cars, trains, or the like, wind noise, footsteps, and the like are each separated.

Further, the position of each sound source is estimated on the basis of the timing or the like at which the waveform of the sound source is detected in each microphone 16. Note that the geometric positional relationship of the microphones 16 in the HMD 100 is fixed, but the positional relationship in the global coordinate system is calculated by correcting the posture of the HMD 100 calculated by the device posture processing unit 46 (see FIG. 4).

Next, environmental information is generated by the sound analysis unit 42, and the operation of the virtual character 3 is controlled on the basis of the environmental information. In the processing shown in FIG. 1, the control of the virtual character 3 based on the noise information (Step 104), the control of the virtual character 3 based on the wind information (Step 105), and the control of the virtual character 3 based on the ground surface information (Step 106) are executed as parallel processing. The control of the virtual character 3 based on each piece of environmental information will be described later in detail.

Next, it is determined whether or not to terminate the processing of presenting the virtual character 3 (Step 107). For example, if the application is terminated or the operation of the HMD 100 is stopped, the presentation of the virtual character 3 is terminated (Yes in Step 107). Further, if the virtual character 3 is continuously presented (No in Step 107), the processing of Step 101 and the following steps is executed again.

As described above, the processing shown in FIG. 6 is constantly performed while the virtual character 3 is displayed. This makes it possible to change the behavior and expression of the virtual character 3 in real time. Further, even when there is a plurality of virtual characters 3 (virtual objects 2) to be displayed, the processing of controlling the operation is executed in accordance with the position of each character.

[Control Based on Noise Information]

Figure 7:
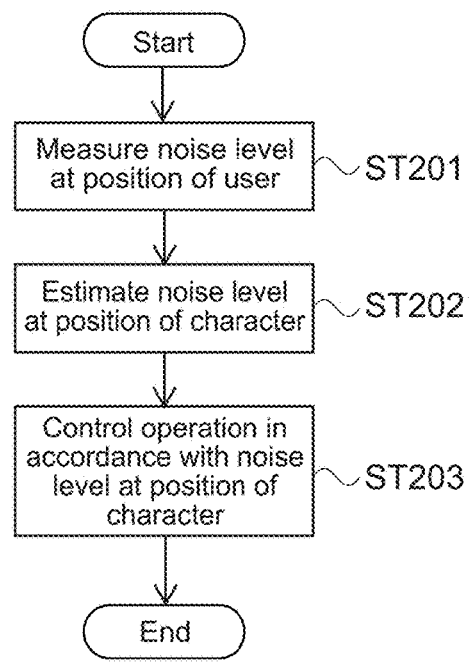
FIG. 7 is a flowchart showing an example of the control of the virtual character on the basis of noise information.
Figure 8A:
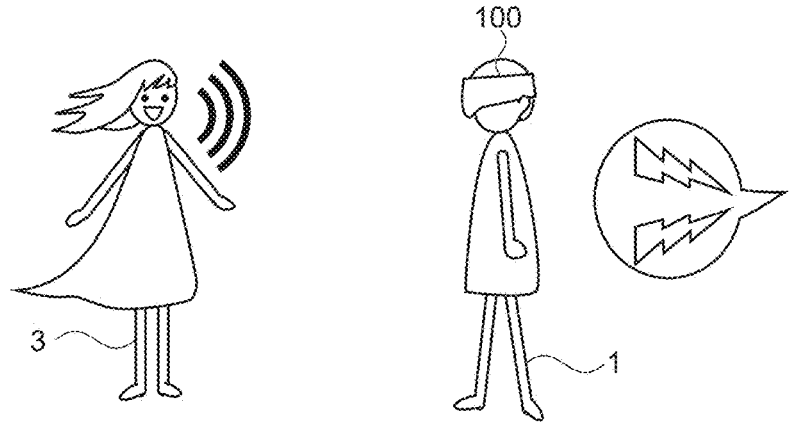
FIGS. 8A and 8B are schematic diagrams showing an example of the control of the virtual character on the basis of the noise information.
Figure 8B:
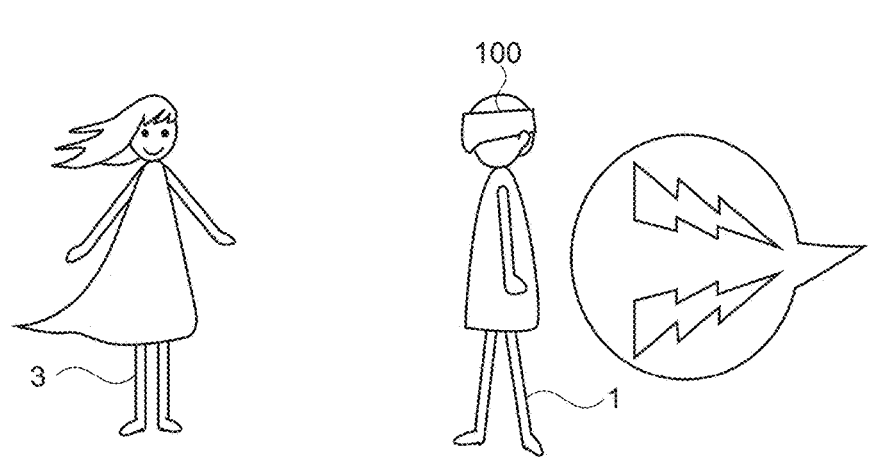

FIG. 7 is a flowchart showing an example of the control of the virtual character 3 based on the noise information. FIGS. 8A and 8B are schematic diagrams showing an example of the control of the virtual character 3 based on the noise information. The processing shown in FIG. 7 is the internal processing of Step 104 shown in FIG. 6.

In this embodiment, the content interaction control unit 53 controls, on the basis of the noise information, at least one of the volume of the utterance, the contents of the utterance, or the way of the utterance by the virtual character 3. This is processing of changing the sound and behavior of the virtual character 3 in accordance with the noise in the real space.

First, on the basis of the detection result of the microphone array 13, the noise level at the position of the user 1 is measured (Step 201). In the following, the noise level at the position of the user 1 will be described as a first noise level.

In this embodiment, the noise level estimation unit 48 measures, as the first noise level, the overall volume level picked up by the microphone array 13. The noise level is measured in units of dB, for example. This measured value is used as noise information. In other words, it can be said that the noise information is the information indicating the first noise level that is the noise level at the position of the user 1.

Note that the position or the like of the sound source that emits noise may be estimated as the noise information.

Next, the noise level at the position of the virtual character 3 is estimated (Step 202). In the following, the noise level at the position of the virtual character 3 will be described as a second noise level.

In this embodiment, the content interaction control unit 53 estimates the second noise level, which is the noise level at the position of the virtual character, on the basis of the first noise level.

For example, if there is a shielding structure such as blocking sounds around the virtual character 3, the noise at the position of the virtual character 3 (second noise level) is considered to be smaller than the first noise level. In this case, the second noise level is set to a value smaller than the first noise level. Further, if the shielding structure completely surrounds the virtual character 3 (for example, if the virtual character 3 exists indoors), the second noise level may be set to 0.

The shielding structure is, for example, a structure of a real object existing in a real space, and is detected on the basis of a space map or the like. Alternatively, a shielding structure using a virtually displayed structure (virtual object representing a pillar, a window, a wall, etc.) may be detected.

Further, if there is no shielding structure around the virtual character 3, the second noise level is set to the same value as the first noise level. Alternatively, it is also possible to reduce the second noise level as the distance between the virtual character 3 and the user 1 increases. Further, if the position of the sound source of the noise or the like is identified, the second noise level may be estimated on the basis of the distance between the sound source and the virtual character 3. In addition, the method of estimating the second noise level is not limited.

Next, the operation of the virtual character 3 is controlled in accordance with the second noise level (Step 203). In this embodiment, the content interaction control unit 53 controls the operation of the virtual character 3 in a plurality of stages divided corresponding to the second noise level. For example, a section including the second noise level is determined, and the control corresponding to the determined section is performed.

In the following description, it is assumed that three sections, i.e., a first section, a second section, and a third section, are set in ascending order as the sections (stages) for dividing the second noise level. For example, the first section is a section in which a noise level of less than 50 dB is classified, the second section is a section in which a noise level of 50 dB or more and less than 70 dB is classified, and the third section is a section in which a noise level of 70 dB or more is classified. In addition, the section of the noise level can be arbitrarily set.

For example, if the second noise level is classified into the first section, the noise level is not so high, and processing of causing the virtual character 3 to perform a normal utterance operation is executed.

FIG. 8A is a schematic diagram showing an exemplary operation of the virtual character 3 when the second noise level is classified into the second section. In this case, it is considered that a situation occurs in which the noise level reaches a certain level and the user 1 has difficulty of hearing the contents of the utterance of the virtual character 3. Here, the contents and volume of the utterance of the virtual character 3 are controlled in accordance with such a situation.

For example, a dialogue (exclamation) calling the user 1 such as "Tosh!" or "Hey!" is added to the contents of the utterance of the virtual character 3. Alternatively, the processing of causing the virtual character 3 to repeatedly utter the same dialogue is executed.

At that time, the volume of the utterance of the virtual character 3 is set to be larger than the volume used in the first section. Alternatively, processing of changing the volume of the utterance so as to increase as the second noise level increases may be executed.

Further, the operation representing the utterance of the virtual character 3 may be changed. For example, the degree of opening of the mouth is set to be larger than that in the case of the first section. Alternatively, the virtual character 3 may be controlled to make a gesture of calling from a distance with both hands put on the mouth. This makes it possible to express the virtual character 3 having reality.

FIG. 8B is a schematic diagram showing an exemplary operation of the virtual character 3 when the second noise level is classified into the third section. In this case, it is considered that the noise level is sufficiently high and the user 1 hardly hears the contents of the utterance of the virtual character 3. Here, an utterance operation of the virtual character 3 is stopped in accordance with such a situation.

In such a manner, when the noise level is very high, control is performed to interrupt the utterance of the virtual character 3. This makes it possible to avoid a situation in which the user 1 misses hearing the contents of the utterance of the virtual character 3.

In addition to the above, the virtual character 3 may be controlled to perform an operation indicating that the noise level is high (for example, a gesture of covering the ears).

[Control Based on Wind Information]

Figure 9:
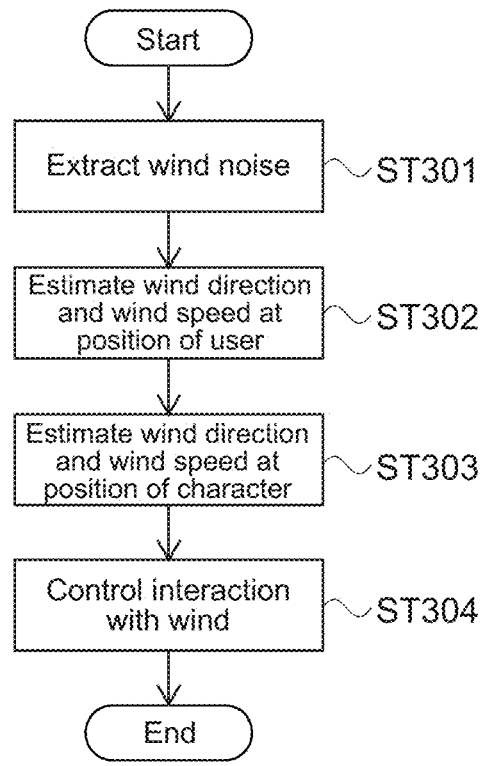
FIG. 9 is a flowchart showing an example of the control of the virtual character on the basis of wind information.
Figure 10A:
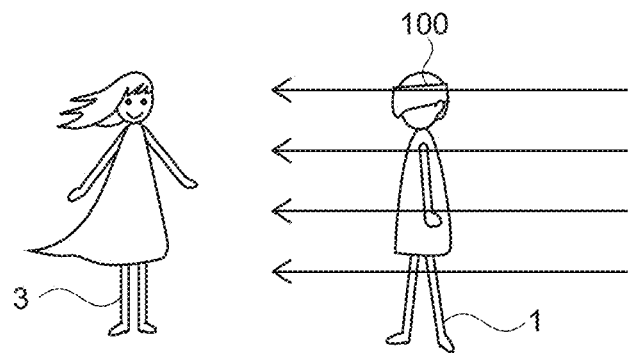
FIGS. 10A and 10B are schematic diagrams showing an example of the control of the virtual character on the basis of the wind information.
Figure 10B:
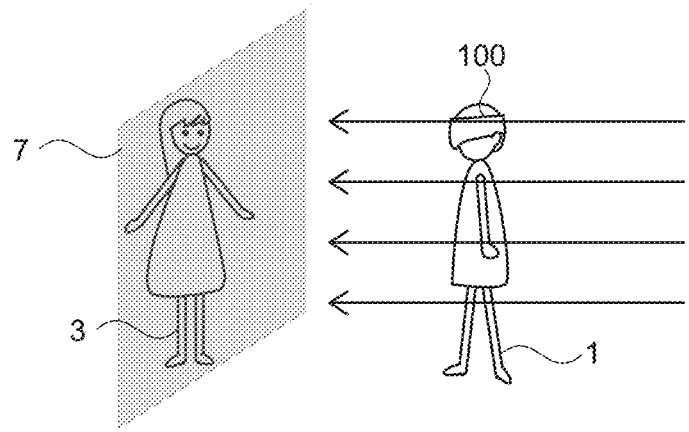

FIG. 9 is a flowchart showing an example of the control of the virtual character 3 based on wind information. FIGS. 10A and 10B are schematic diagrams showing an example of the control of the virtual character 3 based on of wind information. The processing shown in FIG. 9 is the internal processing of Step 105 shown in FIG. 6.

In this embodiment, the content interaction control unit 53 controls the operation representing a reaction of a virtual character (virtual object 2) to the wind in the real space on the basis of the wind information. This is processing of presenting the virtual character 3 as if the real wind were acting on the virtual character 3. This makes it possible to represent the interaction between the virtual character 3 and the actual wind.

First, wind noise is extracted on the basis of the detection result of the microphone array 13 (Step 301). Wind noise is a noise component caused by the wind blowing in the real space, and is extracted for each microphone 16. For example, the sound processing unit 44 extracts (separates) a non-stationary noise component mainly composed of a low frequency component, as wind noise. The method of extracting wind noise is not limited.

Next, the wind direction and wind speed at the position of the user 1 are estimated on the basis of the wind noise at each microphone 16 (Step 302). In other words, the wind direction and wind speed (wind information) at the self-position of the HMD 100 are estimated.

In this embodiment, the wind direction and wind speed estimation unit 49 estimates the wind direction and wind speed (intensity of wind) from the difference in arrival time of the wind noise in each microphone 16. The wind direction and wind speed are estimated to be, for example, "a tail wind of 3 m/s for the user". The method of representing the wind direction, units of wind speed, etc., are not limited. For example, the wind direction may be represented by a direction in the global coordinate system, such as a southeastern wind. Further, the wind speed may be represented by a predetermined level (wind speed level=1 to 5, etc.). Such an estimated value is used as wind information.

Note that, for example, the type of wind (breeze, storm, etc.) may be estimated as the wind information.

Next, the wind direction and wind speed at the position of the virtual character 3 are estimated (Step 303).

In this embodiment, the content interaction control unit 53 estimates the wind direction and wind speed at the position of the virtual character 3 on the basis of the wind information, i.e., the wind direction and wind speed at the position of the user 1. When the wind direction and wind speed at the position of the virtual character 3 are estimated, the space map is referred to. In other words, the wind information is used for estimating the wind direction and wind speed at the position of the virtual character 3 together with the space map data around the user 1.

The wind direction at the position of the virtual character 3 is estimated to be, for example, the same direction as the wind direction at the position of the user 1. Note that if the wind direction frequently changes, the wind direction at the position of the virtual character 3 may be randomly set.

The wind speed at the position of the virtual character 3 is estimated on the basis of the space map. For example, a shielding structure that blocks wind from the periphery of the virtual character 3 is detected. For example, among the objects existing on the windward of the virtual character 3, an object such as a wind guard for the virtual character 3 is detected as a shielding structure. If a shielding structure is present, the wind speed at the position of the virtual character 3 is set to a value smaller than the wind speed at the position of the user 1. Further, for example, if the shielding structure completely surrounds the virtual character 3, the wind speed at the position of the virtual character 3 may be set to 0.

The shielding structure is, for example, a structure of a real object existing in a real space, and is detected on the basis of a space map or the like. Alternatively, a shielding structure using a virtually displayed structure (virtual object representing a pillar, a window, a wall, etc.) may be detected.

Next, the operation of the virtual character 3 is controlled in accordance with the wind direction and wind speed at the position of the virtual character 3 (Step 304). In this embodiment, the content interaction control unit 53 controls the operation (interaction) of the virtual character 3 so as to react to the wind at the position of the virtual character 3.

FIG. 10A schematically shows an example of an interaction between the wind in the real space and the virtual character 3. Here, it is assumed that the wind blowing from behind the user 1 (tailwind) is detected, and the virtual character 3 is displayed a few meters away from the front of the user 1. Further, it is assumed that there is no shielding structure between the user 1 and the virtual character 3.

In this case, the wind direction at the position of the virtual character 3 is estimated to be the direction from the user 1 toward the virtual character 3 (the left direction in the figure). Further, the wind speed at the position of the virtual character 3 is estimated to be similar to the wind speed at the position of the user 1, for example.

The processing of changing the appearance of the virtual character 3 is executed in accordance with the wind direction and wind speed at the position of the virtual character 3 estimated as described above. For example, in FIG. 10A, the virtual character 3 is displayed in a manner that the hair and clothes of the virtual character 3 are blowing. At that time, the direction in which the hair and clothes are blowing is set to the same direction as the wind direction at the position of the virtual character 3 (the left direction in the figure). Further, as the wind speed at the position of the virtual character 3 becomes greater, the degree and frequency at which the hair and clothes are changed are set to be higher. Alternatively, display control indicating a state in which the possessions or accessories of the virtual character 3 react to the wind, or the like may be implemented.

In addition, the contents of the utterance of the virtual character 3 or the like may be controlled. For example, when the wind speed exceeds a threshold value, the control of causing the virtual character 3 to utter a phrase such as "The wind is strong." is executed.

This makes it possible to implement the virtual character 3 that properly reacts to the actual wind, and to sufficiently enhance the reality of the virtual character 3.

FIG. 10B schematically shows a display example of the virtual character 3 in a scene in which the wind is blocked. Here, there is a plate-like shielding structure 7 (e.g., glass window) between the user 1 and the virtual character 3. Note that the wind direction and wind speed at the position of the user 1 and the displayed position of the virtual character 3 are the same as those in FIG. 10A.

In the example shown in FIG. 10B, since the wind of the real space is completely blocked by the shielding structure 7, assuming that the wind is not blown at the position of the virtual character 3, the wind speed at the position of the virtual character 3 is estimated to be zero. In this case, as shown in FIG. 10B, the processing of causing the hair and clothes of the virtual character 3 to blow is not executed.

This makes it possible to avoid an unnatural display such as causing the hair of the virtual character 3 to blow in the place where the wind should not actually blow. This makes it possible to provide a virtual experience without a sense of discomfort.

Note that the wind may exist even at the position of the virtual character 3 depending on the type and position of the shielding structure 7. For example, if there is a gap in the shielding structure 7, the wind speed at the position of the virtual character 3 is set to a value lower than the wind speed at the position of the user 1. In this case, processing is executed in which the hair and clothes of the virtual character 3 are caused to blow in accordance with the estimated value of the wind speed.

As a result, the virtual character 3 displayed in a place where the wind is weakened can be displayed such that the hair is blowing in accordance with the weakened wind.

As described above, in this embodiment, the shielding structure 7 that blocks the wind in the real space or the virtual space is detected, and the reaction of the virtual character 3 to the wind in the real space is adjusted in accordance with the shielding structure 7. In other words, the amount of change in the reaction of the virtual character 3 to the wind is adjusted in accordance with the shape of the space map or the like between the position of the user 1 in the global coordinate system (the self-position of the HMD 100) and the position of the virtual character 3. This makes it possible to sufficiently enhance the reality of the virtual character 3.

[Control Based on Ground Surface Information]

Figure 11:
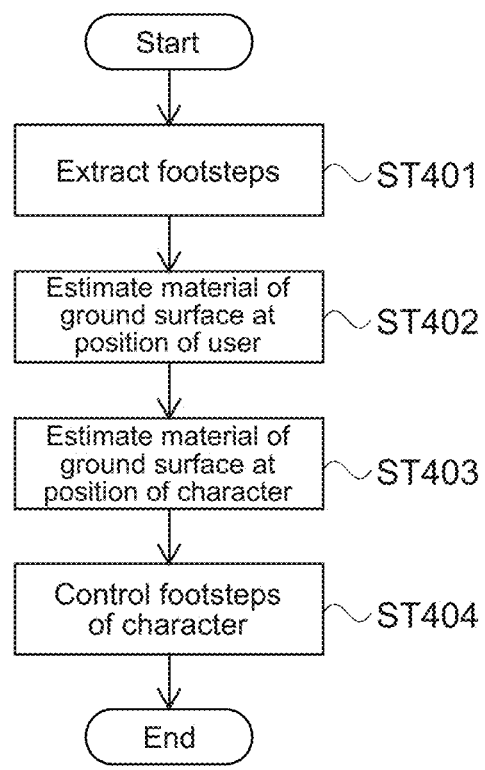
FIG. 11 is a flowchart showing an example of the control of the virtual character on the basis of ground surface information.
Figure 12A:
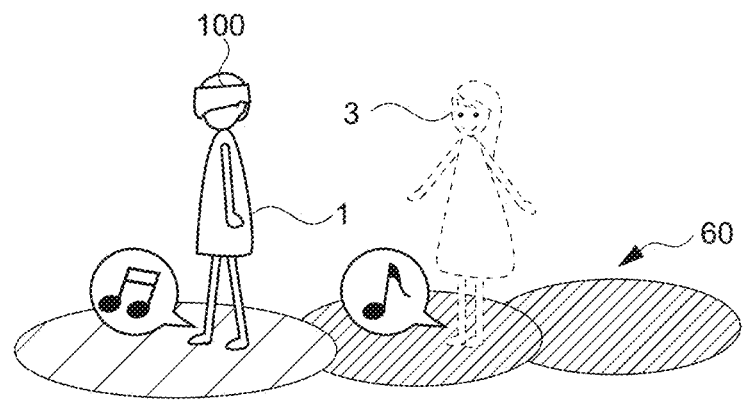
FIGS. 12A and 12B are schematic diagrams showing an example of the control of the virtual character on the basis of the ground surface information.
Figure 12B:
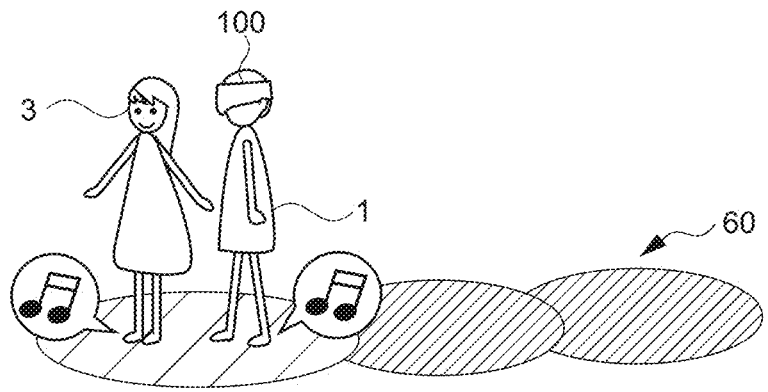

FIG. 11 is a flowchart showing an example of the control of the virtual character 3 on the basis of the ground surface information. FIGS. 12A and 12B are schematic diagrams showing an example of the control of the virtual character 3 on the basis of the ground surface information. The processing shown in FIG. 11 is the internal processing of Step 106 shown in FIG. 6.

In this embodiment, the content interaction control unit 53 controls the footsteps of the virtual character 3 on the basis of the ground surface information. Specifically, the footsteps of the virtual character 3 are set in accordance with the material of the ground surface estimated as the ground surface information. This makes it possible to present the virtual character 3 as if the virtual character 3 were walking on the actual ground surface.

First, the footsteps of the user 1 are extracted on the basis of the detection result of the microphone array 13 (Step 401). For example, the sound processing unit 44 extracts, as footsteps of the user 1, a sound whose sound source is located near the ground surface from among a plurality of sound sources detected by the microphone array 13. At that time, the footsteps may be extracted by referring to timings or the like of vertical movements of the HMD 100 accompanied by the walking motion of the user 1. In addition, the method of extracting the footsteps of the user 1 is not limited.

Next, the material of the ground surface at the position of the user 1 is estimated on the basis of the footsteps of the user 1 (Step 402). In other words, the material of the ground surface at the self-position of the HMD 100 is estimated.

In this embodiment, the ground surface material estimation unit 50 compares the pattern of the footsteps of the user 1 with the patterns of footsteps (reference patterns) recorded in advance as the ground surface data 30. A reference pattern matching the pattern of the footsteps of the user 1 is then selected, and the material of the ground surface corresponding to the reference pattern is estimated as the material of the ground surface at the position of the user 1. The estimation result of the material of the local area is used as ground surface information.

In addition, the method of estimating the material of the ground surface on the basis of the footsteps of the user 1 is not limited. For example, a technique of distinguishing a sound pattern using machine learning or the like may be used.

The material of the ground surface (ground surface information) estimated in such a way does not change frequently, and it can be relatively permanent environmental information. This is used to generate a ground surface map 60. Specifically, the material of the ground surface (ground surface information) is stored in the ground surface data 30 as the ground surface map 60 together with the global coordinate system at the time when the material of the ground surface is estimated.

In each diagram of FIGS. 12A and 12B, the ground surface map 60 is schematically shown using a plurality of circular regions. For example, a circular region having a predetermined radius (e.g., about 0.5 m to 1 m) is set with the position of the user 1 as the center at the time of estimating the material of the ground surface. The estimation result of the material of the ground surface is stored in association with the circular region. In FIGS. 12A and 12B, the difference in the material of the ground surface at each location is represented as the difference in hatching of the circular region.

Thus, in this embodiment, the ground surface material estimation unit 50 generates the ground surface map 60 to which the ground surface information is mapped.

Next, the material of the ground surface at the position of the virtual character 3 is estimated (Step 403).

In this embodiment, the content interaction control unit 53 estimates the material of the ground surface at the position of the virtual character 3 on the basis of the ground surface map 60 to which the ground surface information (the material of the ground surface at the position of the user 1) is mapped. For example, the position at which the virtual character 3 is disposed is acquired, and the material of the ground surface at that position is read from the ground surface map 60.

Therefore, if the material of the ground surface at the position of the virtual character 3 differs from the material of the ground surface at the position of the user 1, the material of the ground surface at the position of the virtual character 3 is adopted (see FIG. 12A). Further, if the position of the virtual character 3 is sufficiently close to the position of the user 1, the material of the ground surface at the position of the user 1 may become the material of the ground surface at the position of the virtual character 3 as it is (see FIG. 12B).

As described above, the ground surface map 60 to which the material of the ground surface estimated at the position of the user 1 is mapped is used for estimation of the material of the ground surface at the position of the virtual character 3.

Next, the footsteps of the virtual character 3 are controlled (Step 304). Specifically, the footstep pattern corresponding to the material of the ground surface at the position of the virtual character 3 is set as the footsteps of the virtual character 3. Subsequently, when the virtual character 3 moves, the pattern of the footsteps most newly set is reproduced to express the footsteps of the virtual character 3.

In the scene shown in FIG. 12A, the virtual character 3 is presented so as to follow the user 1. In this case, the virtual character 3 is disposed behind the user 1. Therefore, for example, when the user 1 is walking looking forward, the virtual character 3 is not displayed in the field of view of the user 1, but the pattern of the footsteps of the virtual character 3 is reproduced so as to know that the virtual character 3 follows the user 1 from behind.

The footstep pattern reproduced here is a pattern set in accordance with the material of the ground surface at the position of the virtual character 3.

For example, in the example shown in FIG. 12A, it is assumed that the ground surface at the position of the user 1 (rough hatched region) is asphalt, and the ground surface at the position of the virtual character 3 (fine hatched region) is grass. In this case, a footstep pattern of walking on the grass is reproduced as the footsteps of the virtual character 3. At that time, the footsteps of the user 1 are sound of walking on the asphalt.

Further, when the user 1 moves forward from the state shown in FIG. 12A, the material of the ground surface (ground surface map 60) at the position of the virtual character 3 following the user 1 changes from grass to asphalt. In accordance with this, the footstep pattern of the virtual character 3 is switched to a sound walking on the asphalt.

As described above, in this embodiment, the processing of changing the footsteps of the virtual character 3 is executed on the basis of the ground surface map 60. This makes it possible to, for example, adjust the timing of changing the footsteps of the virtual character 3 in accordance with the relative positional relationship between the virtual character 3 and the user 1 or the moving speed of the virtual character 3. Thus, it is possible to present the virtual character 3 as if the virtual character 3 were actually moving on the actual ground surface.

Further, in the scene shown in FIG. 12B, the virtual character 3 is presented so as to move alongside the user 1. In this case, the virtual character 3 is disposed in the vicinity of the user 1. If the virtual character 3 is disposed close to the user 1 as described above, the footstep pattern of the virtual character 3 may be controlled on the assumption that the material of the ground surface at the position of the virtual character 3 is a material similar to the material of the ground surface at the position of the user 1.

For example, a footstep pattern corresponding to the material of the ground surface estimated from the footsteps of the user 1 is read and reproduced as the footsteps of the virtual character 3 without change. At that time, the processing of estimating the material of the ground surface at the position of the virtual character 3 from the ground surface map 60 or the like may be omitted. In other words, the footsteps of the virtual character 3 may be controlled without using the ground surface map 60.

Figure 13:
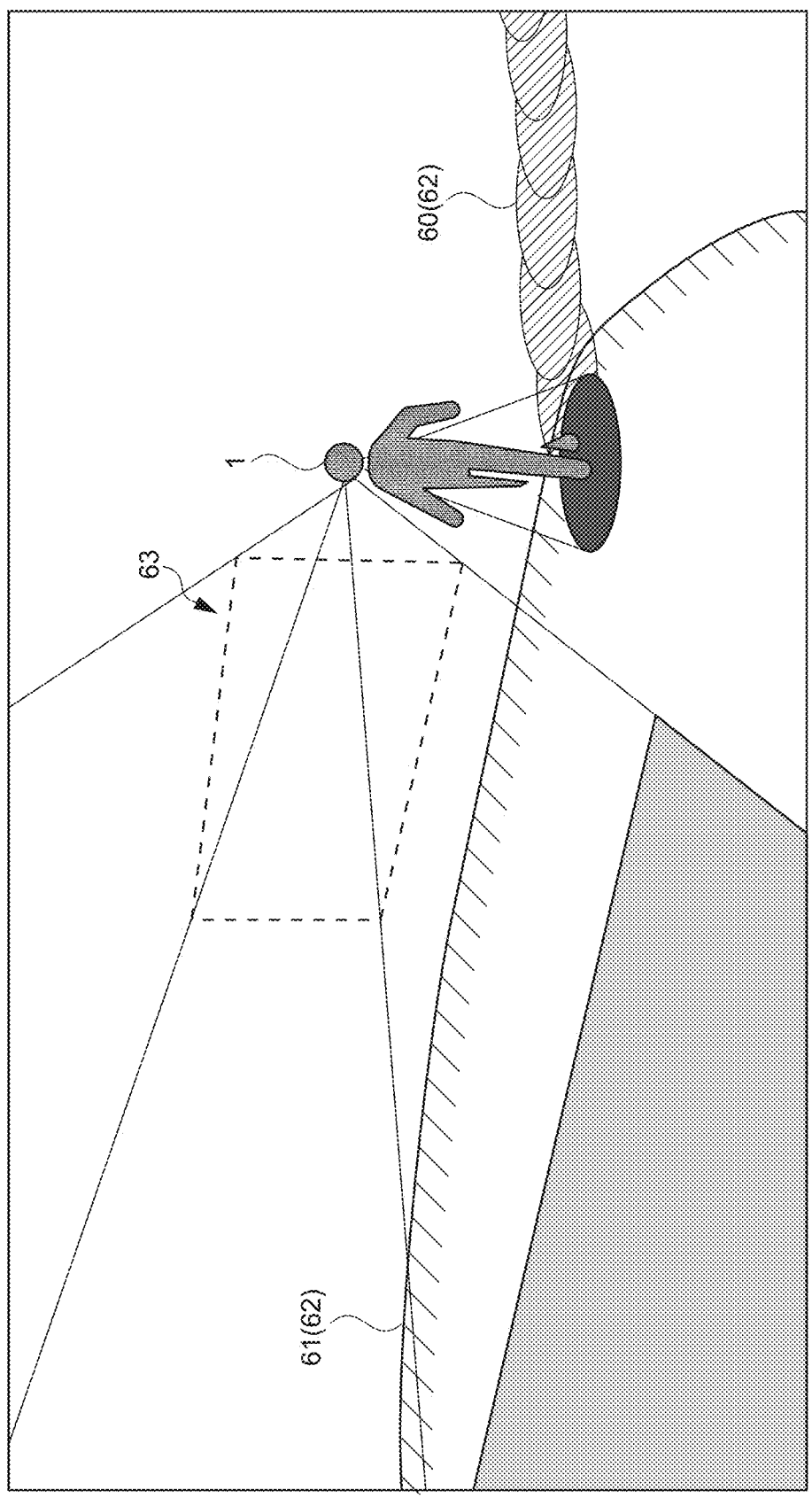
FIG. 13 is a schematic diagram for describing an integrated map.

FIG. 13 is a schematic diagram for describing an integrated map.

In the above description, the foot sound control using the ground surface map 60 generated mainly by using the detection result of the microphone array 13 has been described. In the HMD 100, the footsteps of the virtual character 3 are controlled further using a map (integrated map 62) in which the ground surface map 60 and the space map 61 are integrated.

The space map 61 is a segmentation map of the real space generated on the basis of an image of the real space (see the space map data 29 in FIG. 3). Specifically, image recognition is performed on an image captured by the outward-directed camera 24 mounted on the HMD 100. On the basis of the result of the image recognition, processing such as semantic segmentation for classifying (dividing) each object in the real space is executed to generate a space map 61.

FIG. 13 schematically shows a camera angle of view 63 of the outward-directed camera 24 (shooting range). An object in the real space included in the camera angle of view is an object of segmentation.

In the segmentation based on the image recognition using the outward-directed camera 24, the ground surface in the camera angle of view 63 is also the object of image recognition, and the material or the like of the ground surface is recognized. Such a recognition result is recorded in association with the absolute position of the global coordinate system, and a segmentation result corresponding to the movement path of the user 1 and the change in the camera angle of view 63 of the outward-directed camera 24 can thus be obtained. The segmentation result is a space map 61.

FIG. 13 schematically shows the ground surface (light gray region) to be the target of the current image recognition, and the ground surface already recorded as the space map 61 (region surrounded by rough diagonal lines).

As described with reference to FIGS. 12A and 12B, the ground surface map 60 is a map in which the material of the ground surface is estimated with reference to the footsteps of the user 1. It can be said that this is segmentation for classifying the material of the ground surface on the basis of the environmental sound.

As shown in FIG. 13, in the segmentation of the ground surface based on the environmental sound using the microphone 16, the recognition result (e.g., grass, asphalt, concrete, etc.) is output for the ground surface near the self-position of the user 1 (the HMD 100). The recognition result is recorded in association with the absolute position of the global coordinate system, so that a segmentation result corresponding to the movement path of the user 1 can be obtained. The segmentation result is a ground surface map 60.

FIG. 13 schematically shows the ground surface (dark gray region) to be the current sound pickup range, and the ground surface already recorded as the ground surface map 60 (region of fine diagonal lines).

As shown in FIG. 13, it can be said that the ground surface map 60 is a map obtained by segmenting the ground surface with respect to a region outside the space map 61. In other words, even in the ground surface that has not been imaged by the outward-directed camera 24, the ground surface that becomes the movement path of the user 1 can be segmented.

In this embodiment, the space map information processing unit 47 generates an integrated map 62 in which the ground surface map 60 and the space map 61 are integrated.

For example, the recognition results of the respective maps are maintained as they are for the portions where the ground surface map 60 and the space map 61 do not overlap with each other.

Further, for example, the segmentation results are integrated with respect to the portion where the ground surface map 60 and the space map 61 overlap with each other (dark gray region), that is, the absolute position where the segmentation result based on the environmental sound of the ground surface and the segmentation result based on the image recognition are both obtained.

For example, when the recognition results of the ground surface map 60 and the space map 61 match, the recognition results are maintained as they are. Further, when the recognition results do not match, the recognition result of the ground surface map 60 is set with priority, for example. Alternatively, the recognition result of the space map 61 may be given priority.

Further, the reliability of the segmentation based on the image recognition may be compared with the reliability of the segmentation based on the environmental sound to adopt a recognition result having a high reliability.

Further, if one recognition result is blank, the other recognition result may be used to interpolate the data.

Further, in the ground surface map 60, a footstep pattern may be assigned to the recognition result of the space map 61 with reference to the footstep pattern associated with the material of the ground surface.

In this embodiment, the footsteps of the virtual character 3 are controlled on the basis of the integrated map 62 in which the ground surface map 60 and the space map 61 are integrated as described above. This makes it possible to accurately change the footsteps of the virtual character 3 in accordance with the actual environment. This also makes it possible to assign a footstep pattern to a place where the user 1 is not actually walking. As a result, it is possible to properly control the footsteps of the virtual character 3 over a wide region.

As described above, in the controller 40 according to this embodiment, the environmental information of the real space is generated using the sound of the real space around the user 1 detected by the microphone array 13. This makes it possible to easily grasp the real environment. On the basis of this environmental information, the operation of the virtual character 3 (virtual object 2) on the virtual space constructed corresponding to the real space is controlled. Thus, for example, it is possible to present the virtual object 2 in accordance with the real environment. As a result, it is possible to easily provide a virtual experience with reality.

In order to impart reality to a virtual character or the like that is AR-displayed in a real space, a method of localizing a 3D video and a sound image of the character in a real space has been used. Localizing the position in the real space where the video or sound is presented makes it easier to recognize that a virtual character is "placed" at a certain position in the real space.

On the other hand, various situations are conceivable in which the user feels that the reality of the character is insufficient.

For example, the operation or the like of the character deviating from the real environment may impair the reality of the character. On the contrary, the operation of the character reflecting the real environment is an expression that enhances reality. Especially outdoors, examples of a factor for enhancing reality include a reaction (behavior, utterance, etc.) according to the environment (wind, illumination, smell, season, etc.) in which a virtual character is placed.

However, the acquisition of those environmental parameters often requires a special sensor system. In addition, it may be difficult to implement environment sensing for a wide real space in which a user acts.

For example, a method is conceivable in which characteristics of a real object on the real space (television, air conditioning equipment, chair, etc.) are previously acquired, and the behavior of the character is generated in accordance with the characteristics. In this case, it is difficult to apply to a wide real world because the elements that affect the behavior of the character are limited to a small number of real objects whose properties can be analyzed.

In addition, there has been devised a method of enhancing the communication capability by changing the emotion and facial expression of a character such as an agent in accordance with an input by a user. In this case, the elements that affect the behavior of the character are limited to the user input of an finite pattern. For this reason, a short-term response such as an exchange with an agent is effective, but when a communication with a character in daily contact is assumed, there is a possibility that the pattern becomes monotonous and the response of the character is boring.

In this embodiment, the environmental information is generated on the basis of the sound in the real space picked up by using the microphone unit 10 (microphone array 13). This makes it possible to easily estimate the wind speed in the real space, the material of the ground surface, etc., without using special sensors such as an anemometers and a radar. Further, the estimated position of the environment is constantly changed by the movement of the user 1. This makes it possible to efficiently sense the environment even in a wide space such as outdoors.

In addition, in this embodiment, the operation of the virtual character 3 is controlled in accordance with the environmental information generated using the microphone unit 10. As a result, even in a place where environmental information or the like is not prepared in advance, for example, it is possible to achieve a reaction with reality as if the virtual character 3 were really in the place.

For example, under noise, the virtual character 3 is controlled to speak loudly or to stop speaking. Further, for example, display is executed in which the hair or and clothes of the virtual character 3 blow in accordance with the wind direction and the wind speed when the wind blows into the real space. Further, for example, the footsteps of the virtual character 3 when walking outside the field of view of the user 1 are changed in accordance with the material of the ground surface.

In this manner, use of the environmental information makes it possible to express various virtual characters 3 and to exhibit high entertainment.

Further, in this embodiment, the virtual character 3 is controlled so as to make an appropriate reaction in accordance with the shielding structure 7 located between the position of the virtual character 3 and the position of the user 1.

For example, when there is a shielding structure such as a window glass between the user 1 and the virtual character 3, the virtual character 3 is not affected by noise or wind. This makes it possible to sufficiently improve reality.

Further, in this embodiment, the virtual character is controlled so as to make an appropriate reaction in accordance with the height of the noise level around the virtual character 3 and the user 1.

For example, if the noise level is moderate (refer to FIG. 8A), processing of adding an exclamation for calling, processing of repeating the utterance, and the like are executed with respect to the way of utterance of the virtual character 3. Further, for example, if the noise level is very high (refer to FIG. 8B), the utterance of the virtual character 3 is interrupted. In this case, processing such as restating at the timing when the noise level drops or the like is performed.

In such a manner, the virtual character 3 appropriately responding to the real noise is presented.

Further, in this embodiment, the virtual character is controlled so as to make an appropriate reaction in accordance with the relative positional relationship between the virtual character 3 and the user 1 and the moving speed of the virtual character 3.

For example, processing of changing the footsteps of the virtual character 3 in accordance with the material of the ground surface (ground surface map 60) is executed. Thus, for example, if the virtual character 3 follows the user 1 from behind (see FIG. 12A), a time delay can be provided between the timing at which the footsteps of the user 1 are changed and the timing at which the footsteps of the virtual character 3 are changed. Further, if the virtual character 3 walks alongside the user 1 (see FIG. 12B), a footstep pattern similar to that of the footsteps of the user 1 is used. This makes it possible to express the footsteps of the virtual character 3 realistically.

Further, the ground surface map 60 is integrated with the space map 61 to generate an integrated map 62. This makes it possible to easily expand the space map generated by image recognition, for example, and to efficiently collect environmental information in a wide real space. The integrated map 62 can be reused, for example, when the user 1 comes back to the same location, or can be used for other content. In such a manner, constructing the integrated map also makes it possible to reduce further processing.

Second Embodiment

A mobile terminal according to a second embodiment of the present technology will be described. In the following description, description of the configurations and effects similar to those in the HMD 100 described in the above embodiment will be omitted or simplified.

Figure 14A:
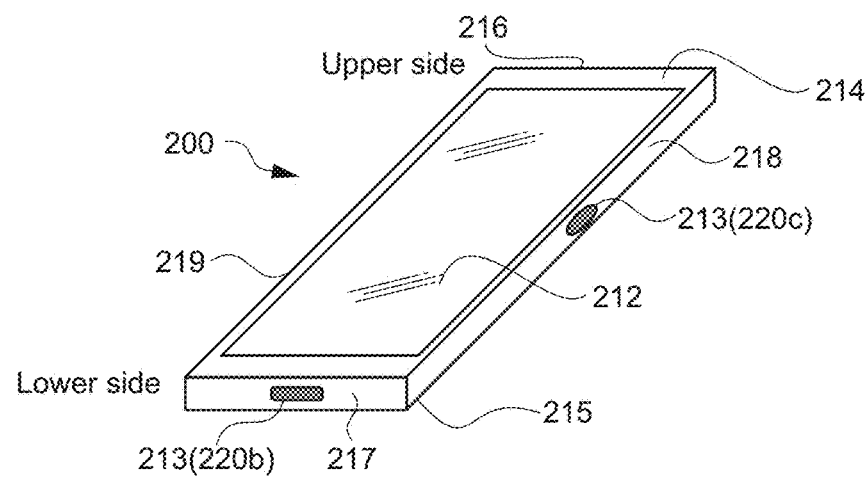
FIGS. 14A, 14B, and 14C are schematic views showing the appearance of a mobile terminal according to a second embodiment.
Figure 14B:
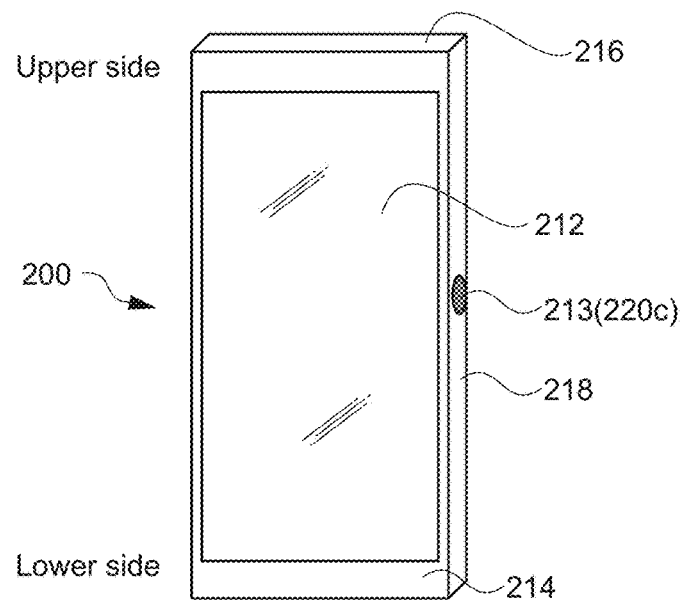
Figure 14C:
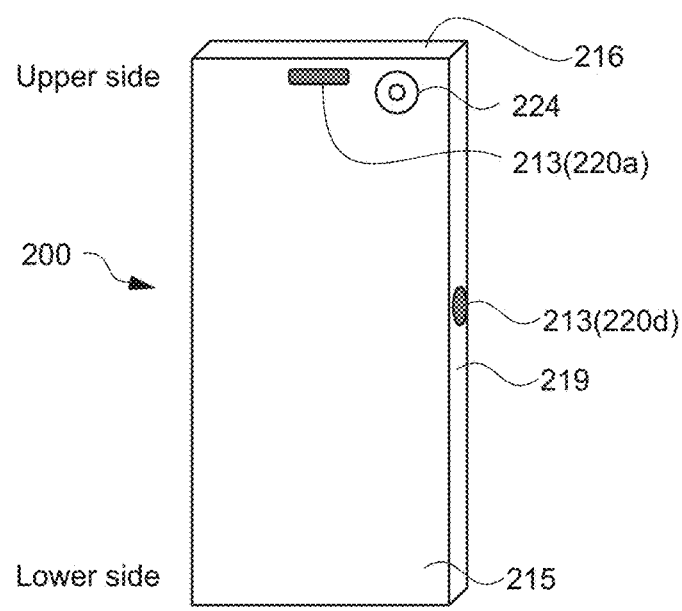

FIGS. 14A, 14B, and 14C are schematic views showing an appearance of a mobile terminal 200 according to the second embodiment. The mobile terminal 200 is an information terminal capable of being carried by the user 1, and is an example of a mobile system that provides virtual experiences to the user 1 at various locations. As the mobile terminal 200, for example, a smart phone, a tablet, or the like is used.

The mobile terminal 200 is a plate-like device and has a display 212, a microphone array 213, and an outward-directed camera 224. The mobile terminal 200 also includes a controller functioning as an information processing apparatus according to this embodiment. FIGS. 14A, 14B, and 14C are schematic perspective views of the mobile terminal 200 from respective different angles.

In the following, the rectangular surface on which the display 212 is provided is referred to as a front surface 214 of the mobile terminal 200. Further, the surface opposite to the front surface 214 is referred to as a back surface 215. Further, the longitudinal direction and the lateral direction of the front surface 214 (back surface 215) are referred to as the vertical direction and the horizontal direction of the mobile terminal 200. The outward-directed camera 224 is provided on the upper side of the back surface 215.

In addition, the upper side surface and the lower side surface when the mobile terminal 200 is viewed from the front surface 214 are referred to as an upper side surface 216 and a lower side surface 217, respectively. Further, the right side surface and the left side surface when the mobile terminal 200 is viewed from the front surface 214 are referred to as a right side surface 218 and a left side surface 219, respectively.

FIG. 14A is a perspective view showing the front surface 214 and the lower side surface 217, FIG. 14B is a perspective view showing the front surface 214 and the upper side surface 216, and FIG. 14C is a perspective view showing the back surface 215 and the upper side surface 216.

The microphone array 213 includes four microphones 220a to 220d. The microphone 220a is provided near the center of the upper side of the back surface 215. The microphone 220b is provided near the center of the lower side surface 217. The microphone 220c is provided near the center of the right side surface 218. The microphone 220d is provided near the center of the left side surface 219.

As described above, in this embodiment, the microphone array 213 is provided in a device (mobile terminal) carried by the user 1.

Of those, the microphone 220b is a microphone disposed to mainly pick up voice calls and environmental sounds of the ground surface. Further, the microphone 220a, the microphone 220c, and the microphone 220d are microphones disposed to mainly pick up wind noise and other environmental sounds for estimating the wind direction and the wind speed.

Note that when the surrounding noise level is estimated, the sound collection results of all the microphones 220a to 200d are used.

The mobile terminal 200 displays an image of the real space captured by the outward-directed camera 224 on the display 212. At that time, the virtual object 2 of the virtual character 3 is superimposed on the image of the real space, thus enabling AR display and the like.

In this embodiment, the environmental information around the mobile terminal 200 (user 1) is generated on the basis of the detection results of the microphone array 213. For example, as the environmental information, a noise level, a wind direction and a wind speed, the material of the ground surface, and the like are estimated. On the basis of those pieces of environmental information, the operation of the virtual character 3 or the like is controlled in a manner similar to the processing described in the above embodiment.

As described above, the present technology can also be applied to a portable terminal apparatus as well as a wearable display such as the HMD 100. In addition, a mobile system in which the HMD 100 and the mobile terminal 200 are combined may be used. In this case, the mobile terminal 200 functions as a controller of the HMD 100. In addition, the hardware configuration to which the present technology is applicable is not limited.

<Other Embodiments>

The present technology is not limited to the embodiments described above and can achieve various other embodiments.

In the above description, the operation of the virtual character has been controlled by estimating the environmental parameters, such as the noise level, at the position of the virtual character. The noise level and wind speed used to control the virtual character need not be parameters at the position of the virtual character. For example, the operation of the virtual character may be controlled by directly using information such as the noise level and the wind speed estimated at the position of the user. This makes it possible to reduce the amount of computation.

In the above description, the control of the operation of the virtual character has been mainly described. Without being limited to the above, the present technology is applicable to any virtual object. For example, virtual objects representing store curtains, flags, and the like are displayed so as to blow in accordance with the wind information. Alternatively, it is also possible to display that objects representing bubbles, balloons, and the like are blown by wind and moves.

It is also possible to change the type of the virtual object to be displayed in accordance with the material of the ground surface. For example, it is possible to display a virtual object such as a plant in a region in which the material of the ground surface is estimated to be grass, and to display a virtual object such as a marker or scribbles in a region in which the material of the ground surface is estimated to be asphalt.

In addition, there is no limitation on how to control the operation of virtual objects using the environmental information.

In addition to the ground surface map, a sound source map or the like in which the position of a sound source or the like is mapped may be generated. For example, when a buzzer sound of a signal or a railroad crossing is detected, it is possible to estimate the position of the signal or the railroad crossing (sound source). The position of such a sound source is appropriately recorded, and thus a sound source map is generated. The operation of the virtual object may be controlled on the basis of such a sound source map.

For example, when a sound of a railroad crossing is heard, it is possible to control the virtual character so as to watch the railroad crossing. This makes it possible to display a virtual object that matches the position of a real sound source.

In the above description, the microphone array provided in the main body of the HMD or the mobile terminal has been described. The microphone array need not be housed in a single housing. For example, an earphone, a headphone, or the like worn on the ear by the user may be provided with a microphone for picking up environmental sounds in order to perform noise cancellation or the like. Such an external microphone may be used to form a microphone array.

For example, a microphone array is formed by combining microphones provided in right and left earphones (headphones) and microphones provided in the HMD. In this case, the positional relationship of each microphone is appropriately estimated by performing a predetermined calibration.

This makes it possible to easily establish a device environment (microphone array) capable of estimating the wind direction and wind speed and the material of the ground surface.

Further, the microphone unit for detecting environmental sounds does not necessarily have to be a microphone array. For example, even if only a single microphone is used, it is possible to detect the noise level as environmental information. In this case, the virtual object is controlled in accordance with the noise level detected by the single microphone. In addition, the configuration of the microphone unit is not limited.

In the above description, a case where an information processing method according to the present technology is executed by a computer such as the HMD 100 or mobile terminal 200 operated by the user 1 has been described. However, the information processing method and the program according to the present technology may be executed by a computer operated by the user 1 and another computer capable of communicating via a network or the like.

In other words, the information processing method and the program according to the present technology can be executed not only in a computer system composed of a single computer but also in a computer system in which a plurality of computers operates in conjunction with each other. Note that, in the present disclosure, a system means a collection of a plurality of constituent elements (devices, modules (components), and the like), and whether or not all the constituent elements are in the same housing is not limited. Thus, a plurality of apparatuses accommodated in separate housings and connected to each other through a network, and a single apparatus in which a plurality of modules is accommodated in a single housing are both the system.

The execution of the information processing method and the program according to the present technology by a computer system include both a case where the generation of environmental information based on the detection result of the microphone unit and the control of the operation of a virtual object based on the environmental information are executed by a single computer and a case where each process is executed by a different computer. Further, the execution of each process by a predetermined computer includes causing another computer to execute a part or all of the process and acquiring a result thereof.

In other words, the information processing method and the program according to the present technology are also applicable to a configuration of cloud computing in which a single function is shared and cooperatively processed by a plurality of apparatuses through a network.

At least two of the characteristic portions according to the present technology described above can be combined. In other words, the various characteristic portions described in the embodiments may be arbitrarily combined without distinguishing between the embodiments. Further, the various effects described above are not limitative but are merely illustrative, and other effects may be provided.

In the present disclosure, "same", "equal", "orthogonal", and the like are concepts including "substantially the same", "substantially equal", "substantially orthogonal", and the like. For example, the states included in a predetermined range (e.g., ±10%) with reference to "completely the same", "completely equal", "completely orthogonal", and the like are also included.

Note that the present technology may also take the following configurations.

(1) An information processing apparatus, including:
a generation unit that generates environmental information of a real space around a user on the basis of a detection result of a microphone unit that detects a sound in the real space; and
an operation control unit that controls an operation of a virtual object presented in a virtual space constructed in accordance with the real space on the basis of the environmental information.

(2) The information processing apparatus according to (1), in which
the microphone unit is a microphone array including at least three microphones having relative positions fixed to each other.

(3) The information processing apparatus according to (2), in which
the generation unit generates, as the environmental information, wind information indicating at least one of a direction or intensity of wind in the real space on the basis of wind noise detected by the microphone array.

(4) The information processing apparatus according to (3), in which
the operation control unit controls an operation expressing a reaction of the virtual object to the wind in the real space on the basis of the wind information.

(5) The information processing apparatus according to (4), in which
the operation control unit detects a shielding structure that blocks the wind in the real space or the virtual space, and adjusts the reaction of the virtual object to the wind in the real space in accordance with the shielding structure.

(6) The information processing apparatus according to any one of (2) to (5), in which
the generation unit generates, as the environmental information, ground surface information indicating a material of a ground surface in the real space on the basis of a footstep of the user, the footstep being detected by the microphone array.

(7) The information processing apparatus according to (6), in which
the virtual object is a virtual character, and
the operation control unit controls a footstep of the virtual character on the basis of the ground surface information.

(8) The information processing apparatus according to (6) or (7), in which
the generation unit generates a first map to which the ground surface information is mapped.

(9) The information processing apparatus according to (8), in which
the virtual object is a virtual character, and
the operation control unit changes a footstep of the virtual character on the basis of the first map.

(10) The information processing apparatus according to (8) or (9), further including
an acquisition unit that acquires a second map, the second map being a segmentation map of the real space, the segmentation map being generated on the basis of an image of the real space, in which
the generation unit generates an integrated map in which the first map and the second map are integrated.

(11) The information processing apparatus according to (10), in which
the virtual object is a virtual character, and
the operation control unit controls a footstep of the virtual character on the basis of the integrated map.

(12) The information processing apparatus according to any one of (1) to (11), in which
the generation unit generates, as the environmental information, noise information indicating a noise level in the real space on the basis of a detection result of the microphone unit.

(13) The information processing apparatus according to (12), in which
the virtual object is a virtual character, and
the operation control unit controls at least one of a volume of utterance, a content of the utterance, or a way of the utterance by the virtual character on the basis of the noise information.

(14) The information processing apparatus according to (13), in which
the noise information is information indicating a first noise level, the first noise level being a noise level at a position of the user, and
the operation control unit estimates a second noise level on the basis of the first noise level, the second noise level being a noise level at a position of the virtual character, and controls an operation of the virtual character in accordance with the second noise level.

(15) The information processing apparatus according to (14), in which
the operation control unit controls the operation of the virtual character in a plurality of stages divided corresponding to the second noise level.

(16) The information processing apparatus according to any one of (1) to (15), in which
the virtual space is an extended real space constituted by superimposing the virtual object on the real space.

(17) The information processing apparatus according to any one of (1) to (16), in which
the microphone unit is provided to at least one of a device to be worn by the user or a device to be carried by the user.

(18) An information processing method to be executed by a computer system, the method including:
generating environmental information of a real space around a user on the basis of a detection result of a microphone unit that detects a sound in the real space; and
controlling an operation of a virtual object presented in a virtual space constructed in accordance with the real space on the basis of the environmental information.

(19) A computer-readable recording medium, which stores a program that causes a computer to execute the steps of:
generating environmental information of a real space around a user on the basis of a detection result of a microphone unit that detects a sound in the real space; and
controlling an operation of a virtual object presented in a virtual space constructed in accordance with the real space on the basis of the environmental information.

REFERENCE SIGNS LIST 1 user
2 virtual object
3 virtual character
7 shielding structure
10 microphone unit
11 housing unit
12 display unit
13, 213 microphone array
16, 16a to 16d, 220a to 220d microphone
23 storage unit
24, 224 outward-directed camera
40 controller
41 input processing unit
42 sound analysis unit
43 content reproduction unit
44 sound processing unit
47 space map information processing unit
48 noise level estimation unit
49 wind direction and wind speed estimation unit
50 ground surface material estimation unit
53 content interaction control unit
60 ground surface map
61 space map
62 integrated map
100 HMD
200 mobile terminal

The invention claimed is:
1. An information processing apparatus, comprising:
a microphone array configured to detect a sound in a real space around a user,
wherein the microphone array includes at least three microphones having a fixed positional relationship; and
a central processing unit (CPU) configured to:
detect a footstep of the user based on the detected sound;
generate, as environmental information of the real space, ground surface information indicating a material of a ground surface in the real space,
wherein the generation of the ground surface information is based on the detected footstep of the user;
control display of a virtual object in a virtual space,
wherein the virtual space is based on the real space; and
control an operation of the virtual object in the virtual space based on the environmental information.

2. The information processing apparatus according to claim 1, wherein
the CPU is further configured to:
detect, based on the detected sound, a wind noise associated with a wind in the real space; and
generate, as the environmental information, wind information indicating at least one of a direction or an intensity of the wind in the real space, and
the generation of the wind information is based on the detected wind noise.

3. The information processing apparatus according to claim 2, wherein the CPU is further configured to control the operation of the virtual object based on the wind information, and
the operation of the virtual object expresses reaction of the virtual object to the wind.

4. The information processing apparatus according to claim 3, wherein the CPU is further configured to:
detect a shielding structure that blocks the wind in one of the real space or the virtual space; and
adjust, based on the shielding structure, the reaction of the virtual object to the wind in the real space.

5. The information processing apparatus according to claim 1, wherein
the virtual object is a virtual character, and
the CPU is further configured to control a footstep of the virtual character based on the ground surface information.

6. The information processing apparatus according to claim 1, wherein the CPU is further configured to generate a first map to which the ground surface information is mapped.

7. The information processing apparatus according to claim 6, wherein
the virtual object is a virtual character, and
the CPU is further configured to change a footstep of the virtual character based on the first map.

8. The information processing apparatus according to claim 6, wherein the CPU is further configured to:
acquire a second map that corresponds to a segmentation map of the real space,
wherein the segmentation map is based on an image of the real space; and
generate an integrated map by integration of the first map and the second map.

9. The information processing apparatus according to claim 8, wherein
the virtual object is a virtual character, and
the CPU is further configured to control a footstep of the virtual character based on the integrated map.

10. The information processing apparatus according to claim 1, wherein
the CPU is further configured to generate, as the environmental information, noise information indicating a noise level in the real space, and
the generation of the noise information is based on the detected sound.

11. The information processing apparatus according to claim 10, wherein
the virtual object is a virtual character, and
the CPU is further configured to control, based on the noise information, at least one of a volume of utterance, a content of the utterance, or a way of the utterance by the virtual character.

12. The information processing apparatus according to claim 11, wherein
the noise information indicates a first noise level at a position of the user, and
the CPU is further configured to:
estimate a second noise level based on the first noise level,
wherein the second noise level is at a position of the virtual character; and
control an operation of the virtual character based on the second noise level.

13. The information processing apparatus according to claim 12, wherein the CPU is further configured to control the operation of the virtual character in a plurality of stages divided corresponding to the second noise level.

14. The information processing apparatus according to claim 1, wherein
the virtual space is an extended real space, and
the extended real space is based on superimposition of the virtual object on the real space.

15. The information processing apparatus according to claim 1, wherein the microphone array is in at least one of a first device wearable by the user or a second device carriable by the user.

16. An information processing method, comprising:
detecting, by a microphone array, a sound in a real space around a user,
wherein the microphone array includes at least three microphones having a fixed positional relationship;
detecting, by a central processing unit (CPU), a footstep of the user based on the detected sound;
generating, by the CPU, ground surface information as environmental information of the real space based on the detected footstep of the user,
wherein the ground surface information indicates a material of a ground surface in the real space;
controlling, by the CPU, display of a virtual object in a virtual space,
wherein the virtual space is based on the real space; and
controlling, by the CPU, an operation of the virtual object in the virtual space based on the environmental information.

17. A non-transitory computer-readable medium having stored thereon computer-executable instructions which, when executed by a computer, cause the computer to execute operations, the operations comprising:
acquiring, from a microphone array, a result of a detection of a sound in a real space around a user,
wherein the microphone array includes at least three microphones having a fixed positional relationship;
detecting a footstep of the user based on the result of the detection of the sound;
generating, as environmental information of the real space, ground surface information indicating a material of a ground surface in the real space,
wherein the generation of the ground surface information is based on the detected footstep of the user;
controlling display of a virtual object in a virtual space,
wherein the virtual space is based on the real space; and
controlling an operation of the virtual object in the virtual space based on the environmental information.

* * * * *